(12) United States Patent
Rogers et al.

(10) Patent No.: US 6,925,397 B2
(45) Date of Patent: Aug. 2, 2005

(54) METER CALIBRATION ACCURACY

(75) Inventors: Warren F. Rogers, Newport, RI (US); John R. Collins, Punta Gorda, FL (US); Jillanne B. Jones, Narragansett, RI (US); William P. Jones, Narragansett, RI (US)

(73) Assignee: Warren Rogers Associates, Middletown, RI (US)

( * ) Notice: Subject to any disclaimer, the term of this patent is extended or adjusted under 35 U.S.C. 154(b) by 409 days.

(21) Appl. No.: 09/822,770

(22) Filed: Mar. 30, 2001

(65) Prior Publication Data

US 2002/0049549 A1 Apr. 25, 2002

Related U.S. Application Data

(63) Continuation-in-part of application No. 09/350,973, filed on Jul. 9, 1999, now Pat. No. 6,691,061, which is a continuation-in-part of application No. 09/083,732, filed on May 22, 1998, now Pat. No. 6,401,045, which is a continuation-in-part of application No. PCT/US97/09505, filed on Jun. 4, 1997, and a continuation-in-part of application No. 08/658,139, filed on Jun. 4, 1996, now Pat. No. 5,757,664.

(51) Int. Cl.[7] .......................... G01F 17/00; G01F 23/00
(52) U.S. Cl. ........................................................ 702/50
(58) Field of Search ............................ 702/50, 51, 188, 702/182, 179, 45; 340/605; 73/40

(56) References Cited

U.S. PATENT DOCUMENTS

| | | |
|---|---|---|
| 3,579,218 A | 5/1971 | Forsythe, Jr. |
| 3,811,598 A | 5/1974 | Schwartz |
| 4,290,305 A | 9/1981 | Gibson et al. |
| 4,410,949 A | 10/1983 | Huellinghorst et al. |
| 4,796,676 A | 1/1989 | Hendershot et al. |
| 4,827,762 A | 5/1989 | Hasselmann |
| 4,835,699 A | 5/1989 | Mallard |
| 4,915,507 A | 4/1990 | Janotta |

(Continued)

FOREIGN PATENT DOCUMENTS

| | | |
|---|---|---|
| CA | 2257589 | 12/1997 |
| CA | 2378699 | 1/2001 |

(Continued)

OTHER PUBLICATIONS

U.S. Appl. No. 09/350,973, Rogers et al., date not available.
EPA Pub. No. 510–K–95–003, "Straight Talk on Tanks: Leak Detection Methods for Petroleum Underground Storage Tanks and Piping" (Jul. 1995).

(Continued)

*Primary Examiner*—John Barlow
*Assistant Examiner*—Demetrius Pretlow
(74) *Attorney, Agent, or Firm*—Kirkpatrick & Lockhart Nicholson Graham LLP

(57) ABSTRACT

A method of estimating the measuring accuracy of each of a plurality of dispensing meters which dispense fluid from a fluid dispensing system including a storage tank includes measuring a volume of fluid dispensed through each of the plurality of dispensing meters during a plurality of time intervals during which fluid is simultaneously dispensed through the plurality of dispensing meters; measuring a volume of fluid dispensed from the storage tank during each of the plurality of time intervals; and calculating a fraction of the volume of fluid dispensed through each of the dispensing meters by performing a regression analysis with respect to the measured volume of fluid dispensed from the storage tank equated with a fraction of a sum of the measured volumes of fluid dispensed through the plurality of dispensing meters during each of the plurality of time intervals. The fraction of the sum of the measured volumes of fluid dispensed through the plurality of dispensing meters equals the sum of the fractions of the measured volumes of fluid dispensed through each of the dispensing meters on average over the plurality of time intervals.

15 Claims, 16 Drawing Sheets

U.S. PATENT DOCUMENTS

| | | | |
|---|---|---|---|
| 4,977,528 A | 12/1990 | Norris | |
| 5,047,101 A | 9/1991 | Trussler | |
| 5,052,212 A | 10/1991 | Cohrs | |
| 5,138,559 A | 8/1992 | Kuehl et al. | |
| 5,184,504 A | 2/1993 | Spring | |
| 5,265,032 A | 11/1993 | Patel | |
| 5,288,367 A | 2/1994 | Angell et al. | |
| 5,297,423 A | 3/1994 | Keating et al. | |
| 5,316,057 A * | 5/1994 | Hasselmann | 141/94 |
| 5,317,899 A | 6/1994 | Hutchinson et al. | |
| 5,351,725 A | 10/1994 | Suthergreen et al. | |
| 5,359,522 A | 10/1994 | Ryan | |
| 5,361,216 A | 11/1994 | Warn et al. | |
| 5,363,093 A | 11/1994 | Williams et al. | |
| 5,371,495 A | 12/1994 | Sturges et al. | |
| 5,375,455 A | 12/1994 | Maresca, Jr. et al. | |
| 5,400,253 A | 3/1995 | O'Connor | |
| 5,400,924 A | 3/1995 | Brodie | |
| 5,402,427 A | 3/1995 | Parker | |
| 5,423,457 A * | 6/1995 | Nicholas et al. | 222/62 |
| 5,447,055 A | 9/1995 | Thompson et al. | |
| 5,471,867 A | 12/1995 | Tuma et al. | |
| 5,490,516 A | 2/1996 | Hutson | |
| 5,528,516 A | 6/1996 | Yemini et al. | |
| 5,530,439 A | 6/1996 | Steele et al. | |
| 5,544,518 A | 8/1996 | Hart et al. | |
| 5,665,895 A | 9/1997 | Hart et al. | |
| 5,686,658 A | 11/1997 | Boren | |
| 5,757,664 A | 5/1998 | Rogers et al. | |
| 5,857,501 A | 1/1999 | Kelerich et al. | |
| 5,988,439 A | 11/1999 | Webb | |
| 6,101,816 A | 8/2000 | Wang et al. | |
| 6,401,045 B1 | 6/2002 | Rogers et al. | |

FOREIGN PATENT DOCUMENTS

| | | |
|---|---|---|
| EP | 0310298 | 5/1989 |
| EP | 009792795 | 3/1999 |
| EP | 00945280 | 10/2002 |
| FR | 2 600 318 | 12/1987 |
| GB | 2124390 | 2/1984 |
| GB | 2138947 A | 10/1984 |
| WO | WO/97/46855 A1 | 12/1997 |
| WO | 97/46855 | 12/1997 |
| WO | WO-PCT/US00/18743 | 1/2001 |
| WO | WO 01/04586 A1 | 1/2001 |
| WO | PCT/US02/10096 | 10/2002 |
| WO | WO 02/079731 A1 | 10/2002 |

OTHER PUBLICATIONS

William E Boyce and Richard C. DiPrima, "Elementary Differential Equations and Boundary Value Problems" Rensselaer Polytechnic Institute (Third Edition).

W.F. Rogers, "Volumetric Leak Detection–A Systems Perspective", ASTM STP 1161 (1992).

Ken Wilcox Assoc., Inc., "Evaluation of the W.R. Associates SIRA Statistical Inventory Reconciliation System (Version 5.2)" Final Report, Feb. 17, 1995, 19 pages.

EPA Pub. No. 510–B–95–009, "Introduction to Statistical Inventory Reconciliation," (Sep. 1995).

* cited by examiner

METER CALIBRATION ACCURACY

CROSS-REFERENCE TO RELATED APPLICATIONS

This application is a continuation-in-part application of and claims priority to U.S. Ser. No. 09/350,973 filed Jul. 9, 1999 now U.S. Pat. No. 6,691,061, which is a continuation-in-part of application Ser. No. 09/083,732 filed May 22, 1998, now issued as U.S. Pat. No. 6,401,045, which is a continuation-in-part application of application Ser. No. 08/658,139 filed Jun. 4, 1996, now issued as U.S. Pat. No. 5,757,664 and international patent application no. PCT/US97/09505 with an international filing date of Jun. 4, 1997, the contents of which are incorporated by reference.

TECHNICAL FIELD

This invention relates to monitoring liquid storage systems, and more particularly to measuring accuracy of metering devices of such systems.

BACKGROUND

The great majority of liquid storage systems feature multiple independent dispensing devices each with its own meter or set of meters. Physical measurement of the calibration accuracy of the meters is expensive and disrupts facility operation. On the other hand, at a high volume site pumping as much as one million gallons per month, a 5000 gallon excess stock loss could be pumped through meters out of calibration by as little as one-half of one percent of flow.

Regardless of the number of dispensing devices, storage systems are susceptible to leaks. Slow leaks can go undetected over time due to inaccuracies in meter calibration, i.e., a slow leak can be misinterpreted as an inaccuracy in meter calibration. Undetected leaks, and undetected increases in leak rates result in wasteful loss of stored liquid.

Large quantities of liquids and similar materials are often stored in bulk storage containers or tanks, which may be located above-ground, partially above-ground, or completely below ground. Such containers or tanks are generally connected by piping to flow-meters or dispensers.

For example, underground storage tanks (UST's) and, occasionally, above-ground storage tanks (AST's) are used to store petroleum products and fuel to be dispensed at automobile service stations, trucking terminals, automobile rental outlets, and similar operations through gasoline, diesel, or kerosene dispensing pumps. Fuel product is generally delivered to such facilities by a gravity drop from a compartment in a wheeled transport means such as a fuel delivery truck or an introduction of product through an underground piping system. AST's or UST's are often located at central distribution locations so that product can be subsequently withdrawn from the tank system to be transported for delivery to a variety of such facilities. A distribution location with UST's or AST's may receive deliveries of product from, e.g., a pipeline spur, wheeled transport, a barge, or a rail car.

Direct observation of the operating condition of such tanks and storage containers is difficult or impossible. The various methods for identifying the amount of product in tank systems have varying levels of accuracy, repeatability, and performance. Moreover, the accuracy of devices which measure the amount of product dispensed from the storage containers and tanks differs greatly, and may or may not be temperature compensated. The amount of product actually delivered to the tank system is often measured inaccurately and, frequently, not at all. Rather, the owner or operator of the tank or vessel usually records the invoiced amount of product delivered as the actual amount introduced to the tank system, without having any means of confirming whether the invoiced amount of product delivered is correct.

Consequently, effective management of such facilities is complicated by the numerous errors in the various measuring devices and procedures used to establish a baseline for management, planning and decisionmaking. Effective management requires the following:

1. Accurate measurement of the volume stored in the system.
2. Accurate determination of the volume dispensed from the system.
3. Accurate determination of the amount of product introduced into the system.
4. Identification of volumes added to or removed from the tank system which are not otherwise recorded.
5. Rapid identification of leakage from the tank system.
6. Continuous monitoring and diagnosis of the operating performance of all of the component measuring devices of the system.
7. Continuous analysis of sales data to predict demands of product from the system.
8. Determination of optimal reorder times and quantities as a function of ordering, transportation, holding, and penalty costs in order to minimize total costs of operation and/or to maximize profits.

Traditionally, these functions were performed crudely or, in many cases, not at all. Volume measurements were, and in many instances still are, based on imperfect knowledge of the geometry, dimensions, and configuration of the storage vessel. Also, dispensing meters are frequently miscalibrated. This is true even when tank systems are regulated, due to the breadth of tolerance permitted for individual sales as related to total tank volume. For example, deliveries from the delivery vehicle are almost always unmetered, additions of product from defueling vehicles are typically undocumented, and theft of the product is not uncommon.

Leakage of product has, in recent years, assumed a dimension far in excess of the mere loss of the product. Environmental damage can, and frequently does, expose the operator to very large liabilities from third party litigation in addition to U.S. Environmental Protection Agency (EPA)-mandated remediation which can cost in the range of hundreds of thousands of dollars. The EPA's requirements for leak detection are set forth in EPA Pub. No. 510-K-95-003, *Straight Talk On Tanks: Leak Detection Methods For Petroleum Underground Storage Tanks and Piping* (July 1991), which is incorporated herein by reference.

To address these concerns, Statistical Inventory Reconciliation (SIR) was developed. The SIR method consists of a computer-based procedure which identifies all of the sources of error noted above by statistical analysis of the various and unique patterns that are introduced into the inventory data and, in particular, into the cumulative variances in the data when viewed as functions of product height, sales volumes, and time.

SUMMARY

In general, in one aspect, the invention features a method of estimating the measuring accuracy of each of a plurality of dispensing meters which dispense fluid from a fluid dispensing system including a storage tank. The method includes measuring a volume of fluid dispensed through each of the plurality of dispensing meters during a plurality of time intervals during which fluid is simultaneously dispensed through the plurality of dispensing meters; measuring a volume of fluid dispensed from the storage tank during each of the plurality of time intervals; and calculating a fraction of the volume of fluid dispensed through each of the dispensing meters by performing a regression analysis with respect to the measured volume of fluid dispensed from the storage tank equated with a fraction of a sum of the measured volumes of fluid dispensed through the plurality of dispensing meters during each of the plurality of time intervals, the fraction of the sum of the measured volumes of fluid dispensed through the plurality of dispensing meters being the sum of the fractions of the measured volumes of fluid dispensed through each of the dispensing meters on average over the plurality of time intervals.

Implementations of this aspect of the invention may include one or more of the following features. The regression analysis includes a least squares regression. The volume of fluid dispensed from the storage tank is measured by measuring the height of the fluid in the storage tank. The regression analysis is performed by treating the sum of the measured volumes of fluid dispensed through the plurality of dispensing meters as independent variables. The method further includes identifying leakage from the fluid dispensing system. The method further includes accurately measuring performance of a vapor recovery system of the fluid storage system by comparing an amount of fluid recovered from vapor against an actual amount of fluid dispensed through the dispensing meters.

In another aspect, the invention features an apparatus for estimating measuring accuracy for a fluid dispensing system including a storage tank. The apparatus includes a plurality of dispensing meters which dispense fluid from the fluid dispensing system and which measure a volume of fluid dispensed through each of the plurality of dispensing meters during a plurality of time intervals during which fluid is simultaneously dispensed through the plurality of dispensing meters; a gauge for measuring a volume of fluid dispensed from the storage tank during each of the plurality of time intervals; and a processor for collecting data indicative of the volumes of fluid measured by the plurality of dispensing meters and the gauge and for calculating a fraction of the volume of fluid dispensed through each of the dispensing meters by performing a regression analysis with respect to the measured volume of fluid dispensed from the storage tank equated with a fraction of a sum of the measured volumes of fluid dispensed through the plurality of dispensing meters during each of the plurality of time intervals, the fraction of the sum of the measured volumes of fluid dispensed through the plurality of dispensing meters being the sum of the fractions of the measured volumes of fluid dispensed through each of the dispensing meters on average over the plurality of time intervals.

In another aspect, the invention features a method of determining a rate of leakage for fluid leaking from a fluid dispensing system, which includes either one or a plurality of dispensing meters for dispensing fluid and a storage tank. The method includes measuring a volume of fluid dispensed through the dispensing meter during a plurality of time intervals each having an elapsed time; measuring a volume of fluid dispensed from the storage tank during the elapsed time of each of the plurality of time intervals; and calculating a rate of leakage for fluid leaking from the fluid dispensing system by performing a regression analysis with respect to the measured volume of fluid dispensed from the storage tank equated with a fraction of a sum of the measured volume of fluid dispensed through the dispensing meter and the elapsed time during each of the plurality of time intervals, the fraction of the sum of the measured volume of fluid dispensed through the dispensing meter and the elapsed time being the sum of a fraction of the measured volume of fluid dispensed through the dispensing meter and the rate of leakage multiplied by the elapsed time on average over the plurality of time intervals.

Implementations of this aspect of the invention may include one or more of the following features. The method further includes estimating the measuring accuracy of each of the dispensing meters by calculating the fraction of the measured volume of fluid dispensed through each of the dispensing meters. The method further includes measuring a volume of fluid dispensed through each of a plurality of dispensing meters during the plurality of time intervals; and performing the regression analysis with respect to the measured volumes of fluid dispensed through each of the dispensing meters. Each of the plurality of time intervals occurs when no fluid is being dispensed from the fluid dispensing system. The fluid storage system further includes a fluid line connecting the storage tank and the dispensing meter, and the rate of leakage includes a rate of leakage from the storage tank and a rate of leakage from the fluid line. The method further includes determining the rate of leakage from the fluid line by the regression analysis. Each of the plurality of time intervals occurs when there is fluid in the fluid line and no product is being dispensed. Each of the plurality of time intervals occurs when there is no fluid in the fluid line.

In another aspect, the invention features a method of obtaining inventory information for a fluid storage system including a metering device for measuring a quantity of fluid dispensed by the metering device and a storage tank having a gauge for measuring a volume of fluid in the storage tank. The method includes collecting a plurality measurement data from the metering device and the gauge over a plurality of time intervals; transmitting the plurality of measurement data over a network to a location remote from the fluid storage system; storing the plurality of measurement data at the remote location; and performing a statistical analysis of the stored plurality of measurement data to obtain inventory information for the fluid storage system.

Implementations of this aspect of the invention may include one or more of the following features. The plurality of measurement data is transmitted automatically at predetermined intervals. The measurement data stored at the remote location is stored in a database. The method further includes transmitting results of the statistical analysis to the fluid storage system. The method further includes determining whether there is a leak in the fluid storage system. The method further includes accurately measuring performance of a vapor recovery system of the fluid storage system by comparing an amount of fluid recovered from vapor against an actual amount of fluid dispensed through the dispensing meters.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present invention provides individual continuous measurement of the calibration accuracy of multiple metering devices by statistical analysis of inventory data.

The methods described herein use the apparatus and procedures listed in U.S. Pat. No. 5,757,664 (the '664 patent), the entire contents of which are hereby incorporated by reference, to extract data which is then analyzed to provide continuously monitored measurement of the calibration accuracy of the meters. Furthermore, the present invention builds on the statistical analysis methods of the '664 patent to more accurately provide more accurate measurement of the calibration accuracy of multiple metering device that experience simultaneous disbursements.

As stated in the '664 patent, the method and apparatus described herein applies to under ground storage tanks ("UST's), above ground storage tanks ("AST's") or any type of storage tank. The product stored in the tank may be any fluid, including dry particles that flow in the manner of a fluid.

Figure 1:
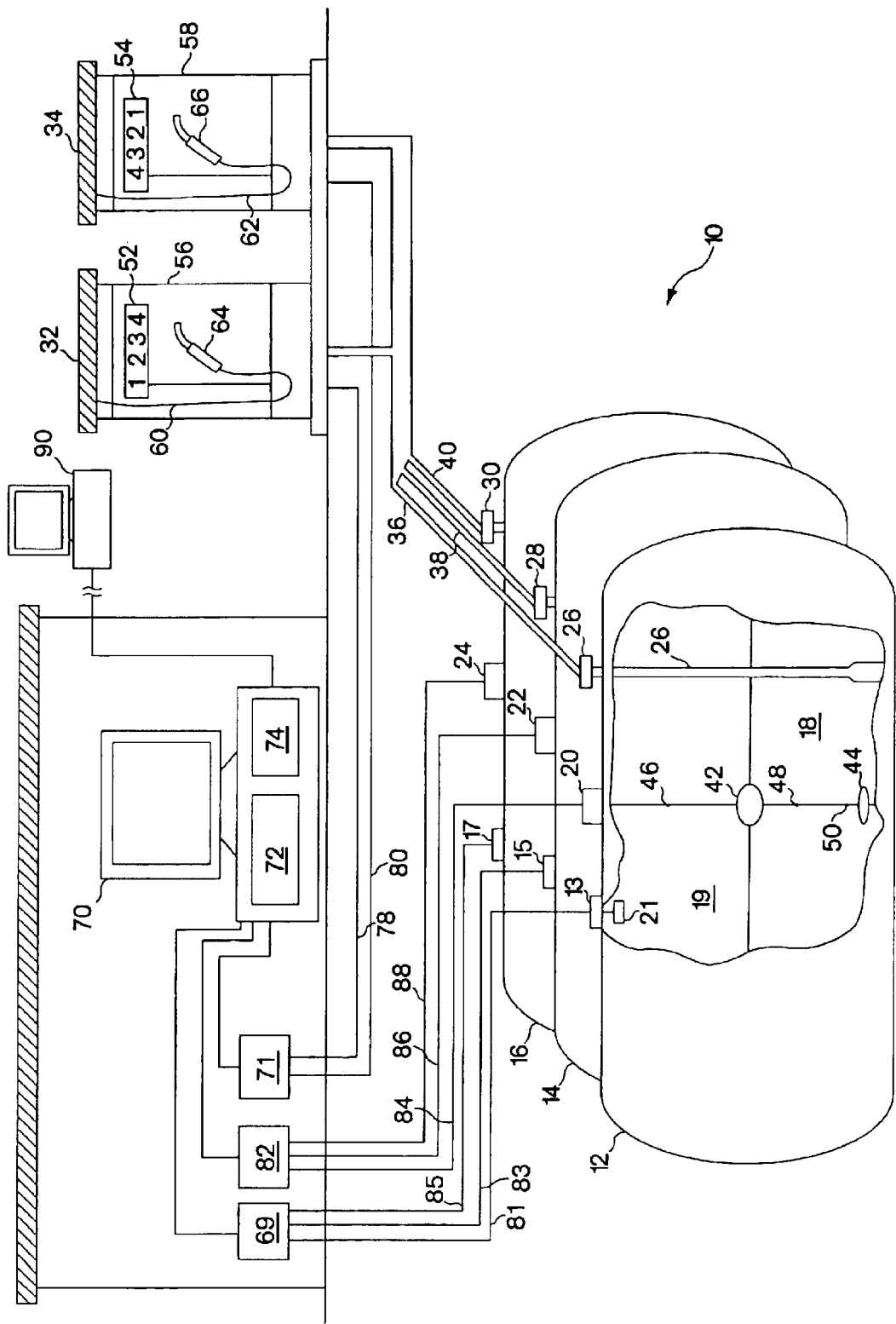
FIG. 1 is a schematic diagram of a facility including an underground tank storage system.
Figure 1A:
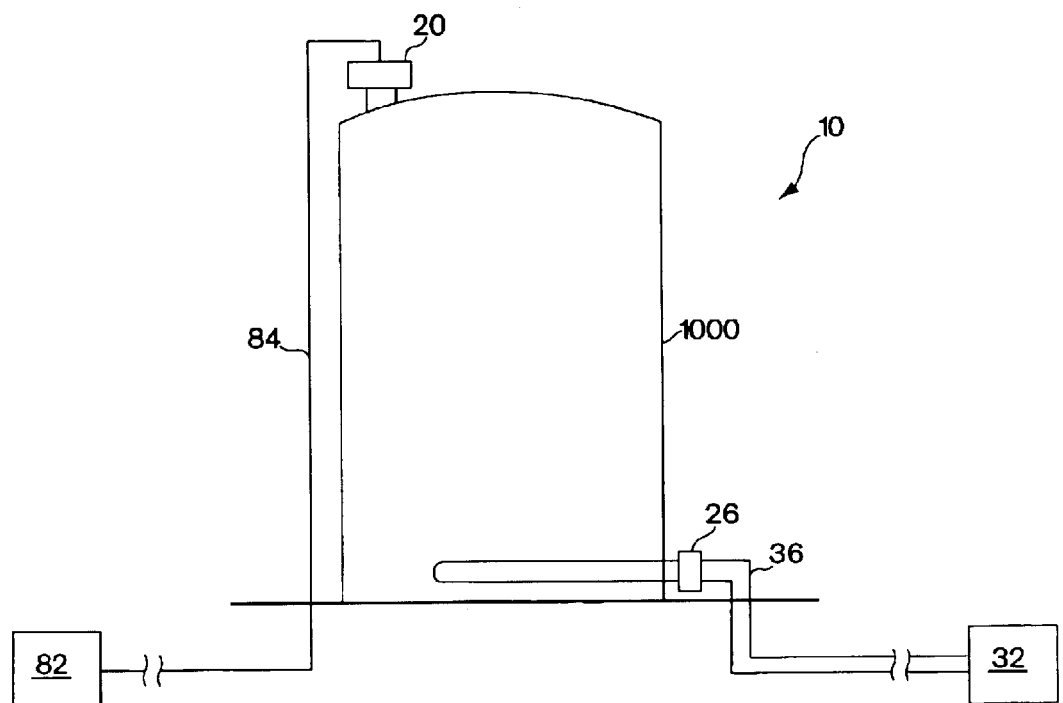
FIG. 1A is a schematic diagram of a facility including an above-ground tank storage system.
Figure 1B:
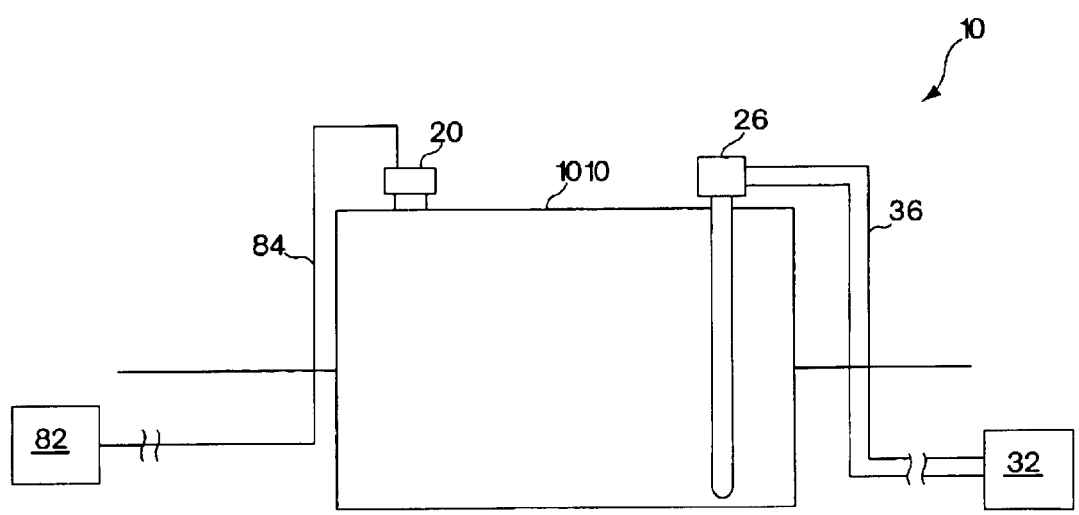
FIG. 1B is a schematic diagram of a facility including a partially above-ground tank storage system.

FIG. 1 shows a UST facility 10, illustrated as an automobile service station. Facility 10 includes a series of UST's 12, 14, 16, which may store the same, or different types of liquid fuel product 18. Volumetric tank gauges 20, 22, 24 in each tank measure the height of product 18 in the tank. Submersible pumps 26, 28, 30 in each tank pump product 18 to one of dispensing pumps 32, 34 through piping lines 36, 38, 40. Alternately, facility 10 may be an AST facility with aboveground tank 1000, as shown in FIG. 1A, or a facility with a partially aboveground tank 1010, as shown in FIG. 1B.

Tank gauges 20, 22, 24 are mounted in tanks 12, 14, 16. The tank gauges may consist of or be based on magnetostrictive tank probes or other sensing technologies. In the case of magnetostrictive technology, two floats 42, 44 surround each probe, e.g., gauge 20 in tank 12. One float 42 floats on the upper surface of product 18 in tank 12, and the other float 44 floats on the interface of product 18 with any water or other foreign material collected at the bottom of tank 12. Tank gauge 20 calculates the difference in position between floats 42, 44 to obtain the height of product 18 in tank 12. Tank gauge 20 also contains temperature sensors 46, 48, 50 spaced along its length to monitor the temperature of product 18 at various depth levels.

Each of the dispensing pumps 32, 34 consists of a totalizer or flow meter 52, 54 disposed in a housing 56, 58 to measure the volume of product 18 dispensed through hoses 60, 62 and nozzles 64, 66. To operate dispensing pump 32, nozzle 64 is removed from housing 56, which actuates dispensing pump 32 and causes product 18 to flow through hose 60 due to the pumping action of submersible pumps 26, 28, 30. A value stored in totalizer 52 is incremented as fuel is dispensed through hose 60. Upon completion of the transaction, nozzle 64 is replaced in housing 56, thereby turning off dispensing pump 32 and discontinuing the action of submersible pumps 26, 28, 30 and totalizer 52.

Transactions are recorded electronically by software in a sales recording device 71 connected to totalizers 52, 54 of dispensing pumps 32, 34. Totalizers 52, 54 in dispensing pumps 32, 34 are connected to sales recording device 71 by means of communications and power supply wires 78, 80.

Depending upon the product stored as well as relevant regulatory requirements, the fueling facility may also be equipped with a vapor collection monitoring device (69) that measures air-liquid ratios of recovered vapors in some systems configurations, flow performance for balance vapor recovery systems, and central vacuum unit monitoring. Such a system would also monitor pressure in the ullage space of the tank (19) by means of communications and power supply wires 81, 83, and 85 which service pressure monitors 13, 15, and 17 that have a sensor 21 that is mounted in the headspace of the tank 10.

Sales recording device 71 contains software capable of emulating the functions of a point of sale (POS) terminal associated with fuel sales made at facility 10. POS emulation software in sales recording device 71 functions on the basis of read only commands to eliminate the possibility of conflict with control commands from a POS terminal employed by facility 10. Alternative data acquisition systems can result in destruction of credit card sales records, inadvertently shutting down the entire system, and/or causing electrical interference in the pump links.

Tank gauges 20, 22, 24 are connected to a tank monitor 82 by means of communications and power supply wires 84, 86, 88 or communicate data through radio frequency transmission. Tank monitor 82 converts raw data obtained from tank gauges 20, 22, 24 into a form usable by a computer.

A computer 70 contains a processor 72 capable of running various computer software applications and a memory 74. Tank monitor 82 and sales recording device 71 are electrically connected to computer 70 to relay totalizer values, product height and temperature data to computer 70. Software executable by processor 72 of computer 70 is capable of querying tank monitor 82 and sales recording device 71 to obtain measurement data at selected time intervals. Facilities that are equipped with vapor monitoring devices 69 may also be queried by processor 72. The data is continuously evaluated as it is collected and is stored in memory 74 of computer 70 for later retrieval and detailed analysis. Alternatively, computer 70 may communicate with a host processor 90 at a remote location. The continuous evaluations or detailed analysis may then be performed by host processor 90, which may be faster or more efficient than computer 70.

As an example, computer 70 may be a personal computer or any other proprietary microprocessor-based unit. Computer 70 may capture data automatically through direct-connect serial interfaces with tank monitor 82 and sales recording device 71, or by manual operator keypad entry. Computer 70 communicates with equipment at facility 10 through four programmable serial communication ports, such as RS-232 communication ports.

Computer 70 may, e.g., store tank dimensions and product characteristics, and concurrent time and date data along with the measurement data. Computer 70 may be used to produce error and analysis reports as calculated by the software. It may also have alarm event-initiated capabilities, such as when a leak is detected in any of the tanks or when monitoring of vapor recovery systems at facilities so equipped indicate that such systems are not performing within required tolerances. Such a computer system can accommodate facility and customer specific requirements while maintaining complete compatibility with other system components. Moreover, any of the data collected can be transmitted over a network, e.g., the internet, such that data collected from multiple remote locations can be processed by computers at a central location. Alternatively, computations can be carried out by on-site computers, the results transmitted over a network to a central monitoring station where results are reviewed and compared, the central stations generating reports and suggestions for improving remote site efficiency.

The SIR method involves reconciling volume data obtained from tank monitor 82 and volume data obtained from sales records. Sales transactions may be detected in a number of ways, including an electronic signal emitted from totalizers 52, 54, by voltage sensing of control relays on pump dispensers 32, 34, or by observation of product removal using tank gauges 20, 22, 24.

It is essential that the measurements used to obtain these two types of data are made simultaneously. The SIR method of the present invention collects and analyzes observations of sales volumes and tank volumes, which are derived simultaneously. Failure to collect both types of data simultaneously would bias estimates derived from separate volume measurements.

The SIR method properly accounts for the effects of temperature, pressure and specific gravity. In addition, product from two or more tanks may be blended, such as to achieve varying petroleum octane levels at pump dispensers 32, 34. When different fluid products are blended, the tanks are treated as one unit, and an additional parameter is introduced to determine the actual blend percentages.

Data concerning the physical characteristics of the tank configurations and the accuracy of the various gauges and metering devices is collected during installation and a set-up phase of operation of facility 10 to create a basis for subsequent statistical analysis. Information is then continuously collected so that the statistical analysis of SIR can be performed by computer 70 or host processor 90.

Several procedures are used either singly or in combination to obtain the volume observations. First, where the system configuration provides for determining whether hoses and dispensers associated with a given tank are active, the system is queried on a minute-by-minute basis, or on the basis of another predetermined time interval, to determine the status of the dispensers. When all of the dispensers are idle, the values from totalizers 52, 54, the tank volumes (i.e. product heights in the tanks) and temperatures are recorded.

Second, submersible pumps 26, 28, 30 are checked to determine on/off status. When it is determined that the pumps are turned off, the values from totalizers 52, 54 are read, and tank volumes and temperatures are recorded.

Third, software algorithms used by computer 70 detect and measure leads and/or lags between the recording of sales events and corresponding gauge and meter readings. When leads or lags are encountered and constitute a physical characteristic of the data measurement and recording system, constrained optimization, rather than unconstrained optimization, may be used to determine parameter estimates. Lagrange multipliers are one example of such a constrained optimization method.

The method of the present invention is capable of providing dynamic monitoring of system performance. For example, the leak detection function is carried out continuously while normal operations, e.g., removals and deliveries, are taking place. To detect leaks dynamically, the software is programmed to detect when sales or delivery events occur and to calculate the volumes of product removed or added as a result of such activities. Thus, dynamic testing does not require that the system be dormant and addresses the entire system from the point of filling to the point of dispensing.

The SIR method of the present invention also distinguishes between one-time removals and continuous losses consistent with leakage. The integrity or leak-free status of the system is not assumed a priori. Instead, the individual and unique characteristic pattern induced by each form of error when viewed along the separate dimensions of time, product height and sales volume are used to identify and quantify the errors. The method may also be used to detect and quantify undocumented removals, e.g., theft or additions of product.

Further, the overall system is self diagnosing in that it determines from the data the maximum degrees of reliability and precision of which a particular operating configuration is capable at any given time, as well as the degree of calibration accuracy.

In particular, product height in the tanks and temperature are measured continuously at, e.g., one-minute intervals. Height and gross volumes are converted to net volumes at, e.g., 60° F. or 15° C., using the algorithms described below. Sales recorded by the totalizers 52, 54 are extracted and stored in memory 74 at times coincident with readings from tank gauges 20, 22, 24. The dispensing system is capable of transmitting a signal indicating whether or not any, all or which individual hoses are active, which information is also stored in memory 74 coincident with taking gauge and meter readings. For the treatment of simultaneous disbursements, discussed in detail below, this feature is especially useful because the recordation of meter readings are disregarded for purposes of meter calibration calculations if the system provides a signal or indication that any metering device was active at the time the meter reading was recorded. Thus, for the statistical meter calibration method discussed further below, meter readings taken when none of the meters are distributing liquid from the system are used in calibration calculations.

The method of the present invention is designed to achieve the maximum accuracy possible within the limitations imposed by the inherent random and irreducible noise in the various measuring devices incorporated. It utilizes multiple measurements over extended time periods to identify and quantify systematic and repeatable effects in the instrumentation and thereby correct for such effects using the known physical characteristics of the devices. The system makes no a priori assumptions as to the accuracy of the devices used to measure product volume in the tank, to measure volumes removed, or as to the accuracy of volumes reported to have been delivered into the system.

The resulting volumetric calculations are independent of the physical characteristics of the tank configuration and the various measuring devices, which may be incorporated in the system. The results do not rely on input entered externally by the operator or from diagnostics internal to the measuring devices used. Instead, the output produced by the software which analyzes the measured data depends only on the patterns induced in inventory data produced by the tank gauges and measuring devices and, in particular, the cumulative variances that result when the various input values are combined.

Various error patterns, which the measuring devices can induce, and the effects of temperature, tank geometry, and orientation on cumulative variances are derived from empirical analysis of real-world inventory data. The system's software synthesizes the output measurements of the various devices based on known characteristics derived from the empirical data. Thus, the software is capable of identifying measurement errors caused by the measuring devices and simultaneously compensating for the effects of those errors.

Gauges can be systematically inaccurate in two ways. The height of the product in the tank can be incorrect, and the height to volume conversion algorithms may not reflect accurately the true dimensions of the tank or its orientation in the ground. The latter may be the result of incorrect measurements or an inappropriate conversion algorithm.

The presence of such systematic effects and their nature may be established by examining the pattern of inventory variances as a function of product height. Errors of this kind induce patterns, which repeat themselves as the tank is filled and emptied. If the tank length is incorrect, a linear pattern is induced. If product height is in error, a curvilinear pattern results reflecting the varying volumes in different cross sections of a cylindrical tank. Tilt along the length of the tank induces a sinusoidal pattern symmetrical about the mid-height of the tank. Absent such errors, the pattern will be purely random, reflecting only the inherent noise of the measuring devices. The absence of randomness and the presence of a systematic pattern serve to identify the presence of systematic error. The pattern of a departure from random and its extent determines the source and extent of the systematic effects and the means necessary to correct them.

Dispensing errors, unlike volume measuring errors, are independent of product height, but are sensitive to the volume of product dispensed. The nature and extent of dispensing errors can be established by examining inventory variances as a function of sales volume. As in the case of volume measurements, in the absence of systematic errors, variances as a function of sales volume will be random. The form and extent of departures from randomness serve to determine the source and extent of the errors and provide for their removal.

Leakage from the system creates a continuous downward trend in the cumulative variance when viewed as a function of time. By contrast, one-time additions and removals of product cause significant upward or downward translations of the cumulative variance, which remain permanently in the record and do not introduce a continuous trend. Leakage is distinguishable from tank gauging errors when viewed as a function of product height because the pattern does not repeat as the tank is filled and emptied. If product is leaking from the system, a series of parallel translations in the cumulative variance is generated, each shifted by the volume of product lost between deliveries. A novel method of calculating leakage effect on the liquid storage system is discussed in greater detail below.

The accuracy of measurements taken from the various components of the system determines the accuracy achievable in any one individual observation. Since the leak rate is computed from a series of successive observations, however, the minimum detectable leak rate can be reduced to any desired magnitude by increasing the number of successive observations recorded. Thus, the system can serve as a final verification for leakage indications obtained by other methods.

At the conclusion of an initial set up period of data collection including one or more delivery and sales cycles, the collected measurement data is analyzed by regression analysis. The initial set-up regression is used to derive tank dimensions and orientation, individual meter calibrations and secular trends. A confidence level value p is computed at the 0.01 level of significance to determine the minimum leak rate detectable by the system, and the residual variance is computed to provide the current noise level of the system.

The regression is performed according to the following equation:

$$st_i(R, L, T) = a - \sum_{j=1}^{i}\sum_{k=1}^{n} \alpha_k Sa_{kj} + \sum_{j=1}^{i} D_j - Et_i Ls + \sum_{j=1}^{m} B_j I_{ij} \quad 1$$

where:
$st_i(R, L, T)$=Volume in gallons derived from the ith gauge reading in inches in a cylindrical tank with or without hemispherical end caps with radius R, length L, and tilt over its length of T inches.
a=Initial inventory in gallons, which is to be estimated.
$Sa_{kj}$=Sales volume recorded on the kth totalizer.
$\alpha_k$=Fraction of sales volume recorded on the kth totalizer actually removed from the tank, which is to be estimated.
$D_j$=Volume of the jth delivery.
$Et_i$=Elapsed time since initiation until the ith gauge reading is recorded.
Ls=Constant gain or loss in product per unit of time.
$B_j$=Volume of product added (e.g. delivery) or removed during some discrete time interval prior to or during observation period j.

$$I_{ij} = \begin{cases} 0 \text{ if } j < i \\ 1 \text{ if } j \geq i \end{cases}$$

All of the parameters are estimated simultaneously using least square estimation procedures. The R and T parameters are derived numerically, but the other parameters are derived analytically.

Further, all of the parameters, including the initial inventory, are estimated simultaneously. The initial volume must be estimated from all succeeding data, even if the tank is initially empty, otherwise the initial gauge reading and its conversion to gallons is assigned a credibility not assumed for all succeeding readings. Also, in a great majority of applications, the initial inventory in an already existing and operating system is not accurately known.

Initial inventory estimation is vital in determining the geometry of the tank. When tank geometry, tank orientation, or tank product height measurement depart from the values obtained from nominal sources, all gauge and meter measurements are affected. It is practically impossible to detect the errors induced in the gauge measurements and correct for them unless the estimation of the initial inventory is made coincident with the estimation of the values of the other parameters.

The estimate of the parameters are based on the totality of the data collected. This means, e.g., that the estimate of leak rate Ls is determined from a linear trend including all of the data collected, not merely at one end of the reconciliation period. Likewise, estimates of tank dimensions and orientation are derived from their overall contribution to reduction in residual variance, as opposed to a sale-by-sale analysis of tank segments.

The volume $st_i(R, L, T)$ is derived from the product height measurement by multiplying the constant area of tank segments of height h (in inches) by tank length L. The volume in gallons of product in a horizontal cylindrical tank of radius R is given by:

$$Vol = \frac{L}{231}\left[R^2\cos^{-1}\left(\frac{R-h}{R}\right) - (R-h)(2Rh-h^2)^{\frac{1}{2}}\right]$$

In the case of a tilted tank, the area of the segments varies with position along the length of the tilted tank, and the volume is determined by integrating over the length L. Such integration does not result in a closed form because the cross sections are not circular, and a numerical integration would severely limit the frequency of observations. Instead, in this application the tank is treated as lying horizontally and the product is considered tilted, to derive an equivalent volume. This integration yields the closed form:

$$Vol = \frac{R^3}{231}\left[(z-1)(\sin^{-1}(2z-z^2))^{\frac{1}{2}} - \frac{1}{3}(2z-z^2)^{\frac{3}{2}}\right]_{\frac{hl}{R}}^{\frac{hu}{R}}$$

The integrand is evaluated between the normalized product heights in inches, hu/R and hl/R, at the lower and higher ends of the tilted tank, respectively. It is standard industry practice to install tanks on an incline to divert water and sludge away from the submersible pumps.

Tank tilt is identified from the pattern it induces in the record of cumulative variances as a function of product height. It is compensated for by fitting the correct mathematical form for height to volume conversions in a tilted tank to the cumulative variance calculated by the method of least squares. This is done simultaneously with estimation of the initial inventory.

Tank length L and radius R are established by equating the first partial derivatives of the sum of squared cumulative variance with respect to length and radius and determining the values, which minimize the sum of, squared variances. Simultaneous estimation of initial inventory is also required when estimating tank length L and radius R.

Errors in measurement of the product height h in the tank are characterized by curvilinear patterns induced by height to volume conversions in the cumulative variance for a cylindrical container when heights are transposed upward or downward. Such errors also are compensated for by minimizing the sum of squared cumulative variances with respect to increments or decrements to measured product height. This estimation also requires simultaneous estimation of the initial inventory of the tank.

In general, the accuracy of the estimates of the tank dimensions, tank orientation and height measurements is confirmed by observing that the cumulative variances of each derived value as a function of nominal product height are random and display no systematic influence or effects.

Dispenser totalizer calibration is continuously monitored and evaluated by minimizing the sum of squared cumulative variances with respect to multiplicative constants associated with individual reported cumulative sales volumes from all pump dispensers associated with a particular tank system. This eliminates the need for manual verification of meter calibration.

In particular, gauge performance is continuously monitored to identify gauge malfunctions or degradation in gauge performance. Monitoring of gauge performance is independent of diagnostics, which are internal to the measuring device. Diagnoses of problems are based only on their impact on the cumulative inventory variances, which are continuously monitored by the software.

If the gauge fails to record changes in product height when the dispensers register sales, an increase in cumulative variances approximately equal to sales volume is observed; this effect can be identified by the monitoring software and a warning of gauge malfunction generated to the operator.

However, observation of the gauge registering product height change, but with a time lag after sales are recorded, may be a feature of normal gauge performance. Such normal gauge performance is identified by repeated positive increments in cumulative variances as sales are completed with subsequent return of the cumulative variance to normal bounds. When such gauge function is determined to be the normal operating characteristic of a particular system, constrained optimization with lagged variables is introduced into the software. Otherwise, the gauge's performance is reported as a malfunction.

Finally, temperatures in the tank are monitored to detect changes that are excessive for the time intervals between observations. Erratic temperature readings are deleted, and may indicate gauge malfunction.

The software computes actual, rather than nominal, delivered quantities and requires no input by the system operator. The operator may choose to input into the system the nominal delivery quantity indicated by the delivery invoice, along with the temperature and coefficient of expansion of the product at the point of pick-up. The software will then compute overages or shortages between the nominal and actual quantities delivered, as well as the overages or shortages caused by temperature-induced variations in the transport of the product to the facility and in the subsequent mixing of the delivered product with that resident in the tank.

Delivery is identified by the software when a positive cumulative variance is observed which exceeds the system noise level and is not succeeded by a return to normal variance bounds. Delivered quantities are computed by estimating the volume increases they induce in multiple, successive observations. The required number of successive observations is determined as that sufficient to generate a confidence width, which is within a predetermined tolerance. The system of the present invention is capable of accounting for sales conducted during delivery and for noise introduced by post delivery turbulence in the tank.

One-time unaccounted for removals or additions to the tank are computed in the same manner. Deliveries are distinguished from such events by computing the rate of input, which in the case of normal gravity delivery should exceed 100 gallons per minute. Other modes of delivery, e.g. pipeline delivery into above ground tanks, are identified by incorporating their known delivery rates.

Leakage from the system is identified by a continuous linear negative trend in the data which exceeds the computed minimum detectable leak rate after all of the various error phenomena described above have been identified and compensated for. This calculation deals with the totality of the data obtained by constantly monitoring known removals and is not restricted to observations made only when the system is dormant. It is also independent of any single data reconciliation calculation in that trends throughout all of the data are evaluated.

All calculations concerning volumes are made on the basis of net volumes, according to the following definitions:

$$\text{Net Volume in Tank} = \text{Gauge Volume} \left(1 - (\tau - 60)CE\right)$$

where:

$t$ = Measured temperature in degrees Fahrenheit (if centigrade, the term in parentheses becomes $(t-15)$).

$CE$ = Coefficient of expansion and $$\text{Net Sales Volume} = \text{Metered Sale} \left(1 - \frac{(t_1 + t_2 - 60)}{2} CE\right)$$

where $t_1$ and $t_2$ are temperatures measured by the tank gauge at the beginning and ending of a sale transaction, respectively. Deliveries are computed in net gallons, but are converted to gross quantities if required, based on external information input by the system operator, as follows:

GT=Gross gallons on invoice at the originating terminal.
NT=Net gallons on invoice at the terminal.
tT=Temperature at the terminal.
CE=Coefficient of expansion.
The program also records:
tA=Ambient temperature in the tank prior to delivery.
tF=Temperature in the tank at the conclusion of delivery.
The following value is computed:

$tS$ = Temperature of the product in the delivery vehicle at the facility at the beginning of delivery.

$$= tF + \frac{NVA}{NVD}(tF - tA)$$

where:

$NVD$ = Actual net volume delivered, previously computed.

$NVA$ = Net volume in the storage tank at the start of delivery.

$NS$ = Net overage(+) (underage(−)) in delivery.

$= NT\text{-}NVD$ $GVD$ = Gross volume delivered.

$= NVD\,(1 + (tF - 60)CE)$ $GVS$ = Gross volume in the transport vehicle at the facility prior to delivery.

$= NVD\,(1 + (tS - 60)CE)$ $GSM$ = Shrinkage due to mixing in the tank.

$= GVS\text{-}GVD$ $GVT$ = Actual gross volume in the transport vehicle at the facility.

$= NVD\,(1 + (tT - 60)CE)$ $GST$ = Shrinkage during transit to the facility.

$= GVT\text{-}GVS$ $GOS$ = Gross overage(+) (underage(−)) adjusted for temperature effects.

$= GT\text{-}GVD + GST + GSM$

Calculations of volumes actually delivered are based on multiple observations of the balance of measured tank volumes and cumulative sales. This method requires frequent simultaneous observations of sales and in-tank volumes (i.e. product heights) and temperatures.

The volume of product in a tank is derived by measuring the height of the product and using the geometry of the tank, which is assumed to be known, to compute the corresponding volume. In many instances, tank dimensions vary substantially from assumed design dimensions. Regulatory specifications permit up to 10% variation in length and diameter of cylindrical tanks.

Tank orientation can also cause complications in the calculations. The volume corresponding to a measured height varies substantially when the tank is tilted away from horizontal or rolled away from vertical.

Further, tanks may also fail to conform to a known geometry either through faulty manufacture or installation, or may suffer significant deformation during the course of operations. For example, many fiberglass tanks sag or bend along their length.

In addition, installed tanks are typically inaccessible, and difficult to measure. Thus, it is necessary to confirm the accuracy of height to volume conversions from generated inventory data and to identify and correct discrepancies where they exist.

The foregoing problems are compounded when two or more tanks are manifolded together. Manifolded tanks are joined together by piping systems and serve common dispensers. Thus, sales quantities from manifolded tanks constitute withdrawals from all tanks in the manifolded system, but not necessarily in equal quantities. Product heights typically vary from tank to tank, but tank geometries, dimensions and orientation may also vary so that a procedure for correcting height to volume conversion errors for a single tank will not apply.

The different factors, which influence inventory data, manifest themselves in distinct ways, which facilitate their identification and correction. These factors are most easily identified by examination of their effects on cumulative departures of actual measured inventory from a theoretical or book value when viewed across a variety of dimensions. In particular, one-time undocumented physical additions or removals of product, e.g. over or under deliveries and pilferage, are evidenced by an addition or subtraction of a constant quantity from the cumulative variance at the time of occurrence and all subsequent observations. Continuous loss of product accumulating over time, e.g. leakage, is evidenced by a loss trend over time. Continuous loss of product varying proportionally with sales value, such a line leak or meter miscalibration, may be determined by identifying a constant negative trend that is cumulative only over periods where delivery lines are pressurized.

A pattern of gains or losses, or both, recurring cyclically as the tank is successively filled and emptied with no long term gain or loss of product, is the pattern associated with height to volume conversion error. The pattern is cyclical because the error source is identical in each cycle as the tank is filled or emptied. It is distinguishable from the other patterns in that it retraces the same path without the translation, which would occur if physical loss or gain of product were taking place.

This problem is most readily diagnosed by analyzing cumulative variance as a function of product height. If the variances are random with no evidence of systematic effects, height to volume conversions may be assumed to be correct. If not, the form of the induced pattern indicates the nature of the conversion error. Thus, an error in tank length induces a linear pattern, an error in tank tilt induces a sinusoidal pattern, and a constant error in tank height measurement induces an arc-like pattern. When other sources of loss or gain are present, the conversion error patterns remain, but are translated in each succeeding filling/emptying cycle to reflect the physical loss of product, which has occurred during that cycle. Thus, confusion between conversion errors and other effects can be eliminated.

Sales readings and product height measurements must be made simultaneously. Since the number of observations in any one sales cycle is typically too few to generate a conversion table of sufficient detail to be of practical use, subsequent sales cycles and their corresponding deliveries must be incorporated. If, however, deliveries are unmetered and are used to approximate the volume (as is the standard industry practice), significant inconsistencies are introduced. If an overage or shortage occurs during delivery, then all subsequent sales volumes correspond to tank cross-sections, which have been shifted upward or downward from their predecessors. Averaging or statistical treatment cannot overcome this deficiency since there is no means of knowing without metering whether, by how much, and in what direction the data has been shifted.

The procedure of the present invention may include determining if height to volume conversion error is a problem. If the error is a problem, then the system must determine the nature of the problem, e.g. tank dimensions, tank orientation, height measurement or unknown tank geometry, and whether the conversion problem is compounded by other gains and losses. If leakage is suspected, an on-site leak detection investigation is undertaken. In no leakage is indicated, and one or all of tank dimensions, tank orientation and height measurement are problems, new conversion factors are calculated and confirmed using the diagnostic procedures described herein.

If unknown tank geometry or manifolded systems are encountered, the exact current percentage of metered sales actually dispensed from each dispenser is determined by physical measurement. A high order polynomial using a variable of measured product height is used to convert height to volume. The parameters of the polynomial are derived from the differences between measured product height corresponding to the beginning and ending of sales events, which do not overlap deliveries.

For a single tank, actual dispensed quantities are regressed using a polynomial based on the differences in measured product height before and after individual sales, subject to the constraint that when the polynomial is evaluated at a height equal to tank diameter, the result is the total tank volume. Observations, which include delivery events, are discarded.

$$ASale_i = a_1(h_{i-1} - h_i) + a_2(h_{i-1}^2 - h_i^2) + \ldots + a_n(h_{i-1}^n - h_i^n)$$

$$Vol = a_1 d + a_2 d^2 + \ldots + a_n d^n$$

A fifth order polynomial has proven adequate in most cases. Residual analysis may be used to determine adequacy of the polynomial in the presence of severe tank distortions, and higher order polynomials may be introduced as necessary. The number of observations required is determined by estimating a confidence bound around the resulting polynomial with a width adequate for the desired resolution. Thus, $ASale_i$ = Actual dispensed volume in period $i$.

$h_i$ = Product height upon conclusion of $ASale_i$.

$h_{i-1}$ = Product height prior to commencement of $ASale_i$ and after completion of $ASale_{i-1}$.

$d$ = Diameter of tank.

$Vol$ = Total volume of tank.

The converted volume for height h is then given by:

$$Vol(h) = a_1 h + a_2 h^2 + \ldots + a_n h^n$$

The omission of a constant term in the regression implies that $$Vol(h) = 0 \text{ when } h = 0$$

This ensures that the polynomial derived from the height differences is well defined.

For manifolded systems, actual sales are regressed simultaneously on individual polynomials based on the various height differences in the several tanks, which correspond to a particular sales volume, subject to the constraint that each polynomial evaluated at the corresponding tank diameter yields the total volume of that tank.

$$ASale_i = a_{11}(h_{i-11} - h_{i1}) + a_{21}(h_{i-11}^2 - h_{i1}^2) + \ldots +$$
$$a_{n1}(h_{i-11}^n - h_{i1}^n) +$$
$$a_{12}(h_{i-12} - h_{i2}) + a_{22}(h_{i-12}^2 - h_{i2}^2) + \ldots +$$
$$a_{n2}(h_{i-12}^n - h_{i2}^n) + \ldots + a_{1m}(h_{i-1m} - h_{im}) +$$
$$a_{2m}(h_{i-1m}^2 - h_{im}^2) + \ldots + a_{nm}(h_{i-1m}^n - h_{im}^n)$$

where:

$ASale_i$ = Actual Sales volume in period $i$.

$h_{i-1j}$ = Height of product in tank $j$ after completion of $Asale_{i-1}$ and prior to commencing $Asale_i$.

$j = 1, 2, \ldots m$ $h_{ij}$ = Height of product in tank $j$ after completion of $ASale_i$.

$m$ = Number of tanks manifolded.

Volume conversion for the m measured heights, $h_1$, $h_2$, $\ldots h_m$ in the total system is:

$$Vol(h_1, h_2, \ldots, h_m) = \sum_{i=1}^{m} \sum_{j=1}^{n} a_{ji} h_i^j$$

where:

$h_i$ = Height of product measured in the $i$th tank in the manifold

Delivery inaccuracies have no impact on this calculation since all observations made during deliveries are discarded. Height changes are related only to the corresponding volumes dispensed.

Prior determination of actual quantities dispensed, as opposed to metered quantities, ensures that the only remaining source of error is random measurement error. Regression is designed to accommodate random error of this kind and to facilitate inferences when errors are present.

An alternative method of estimating volume of product based on product height in single or manifolded tanks involves determining a volume function by integrating a differential of the volume function. The total differential of the volume function is estimated using one of several procedures, e.g., least squares estimation. For example, for a manifolded system of storage tanks, if $$Sa_i = V(h_{1i}, h_{2i}, \ldots, h_{mi}) - V(h_{1i+1}, h_{2i+1}, \ldots, h_{m-1})$$

where $sa_i$ is the measured volume change associated with measured changes in product height during a dispensing event from the manifolded tanks, then $$Sa_i = V(h_{1i}, h_{2i}, \ldots, h_{ml}) - V(h_{1i+1}, h_{2i+1}, \ldots, h_{mi+1})$$

$$\approx V_1(h_{1i}, h_{2i}, \ldots, h_{mi})(h_{1i} - h_{1i+1}) +$$

$$(h_{1i}, h_{2i}, \ldots, h_{mi})(h_{2i} - h_{2i+1}) + \ldots +$$

$$V_m(h_{1i}, h_{2i}, \ldots, h_{ml})(h_{ml} - h_{mi+1})$$

where $V_j(h_{1i}, \ldots, h_{mi})$ is the partial derivative of the volume function with respect to $h_j$, the height of the fluid in the $j^{th}$ tank. The least squares technique provides maximum likelihood estimates because measurement errors occurring in tank gauges 20, 22, 24 have been established to be normally distributed.

A differential function for a volume function having any functional form may be estimated in this manner. For example, a high order polynomial may be used and constrained to have a preset volume at a maximum height, zero volume for zero height in all tanks and/or zero value of the first derivative at maximum height and at zero height.

For example, if $h_{ij}$ = product height in tank $i$ at the completion of sale $j$ and prior to the start of sale $j + 1$, $Sa_k$ = volume dispensed in sale $k$, and the volume function is an $r^{th}$ order polynomial in the form $$Vol(h_1, h_2, \ldots, h_m) = \sum_{i=1}^{m} \sum_{j=1}^{n} a_{ij} h^j$$

then $$Sa_k \approx \sum_{i=1}^{m} \sum_{j=1}^{r-1} (j+1) a_{i,j} h_{ik}^j (h_{ik-1} - h_{ik})$$

where the linear term of the polynomial is omitted to provide a zero derivative at h=0. Then, the following equation may be minimized $$\sum_k \left( Sa_k - \sum_{i=1}^{m} \sum_{j=1}^{r-1} (j+1) a_{ij} h_{ik}^j (h_{ik-1} - h_{ik}) \right)^2$$

subject to $$\sum_{j=1}^{r-1} (j+1) a_{ij} h\max_{ij}^j = 0$$

and $$\sum_{j=2}^{r} a_{ij} h\max_{i}^j = Vol\max_i$$

for $i = 1, 2, \ldots, m$ where $h\max_i$ is the maximum product height in tank i, $Vol\max_i$ is the preset maximum volume in tank i, and m is the number of tanks in the manifolded system.

The foregoing equation works well for m=1. For m>1, a further constraint is required to ensure upward concavity of the individual volume functions near zero volume. This is accomplished by constraining the second partial derivatives of the individual volume functions to be positive at zero volume. In the case of polynomial functions and tanks with equal radii, this reduces to the constraint $a_{11} = a_{21} = \ldots = a_{m1}$.

Alternatively, the volume function may take the form $$V(h) = \frac{e^{f(h)}}{1 + e^{f(h)}}$$

where $f(h)$ is a function of the height h. The derivative of $V(h)$ is $$V'(h) = \frac{e^{f(h)} f'(h)}{(1 + e^{f(h)})^2}$$

Numerical minimization may be used to estimate this derivative function. An advantage of a function in the form of $V'(h)$ is that it asymptotically approaches zero (0) near h=0 and one (1) near the maximum height.

Determining the volume function by integrating an estimated derivative of the volume function has many advantages. For example, the data used to estimate the derivative consists of discrete measurements of dispensed volumes and corresponding product height changes, which avoids introducing ambiguities and errors due to inaccurate calculations of deliveries of the product. The data does not need to be sequential, and data for periods during deliveries and post delivery turbulence may be discarded. Because the only error sources are in the metering devices (for which calibration may be determined as described herein) and random errors of height measurement (the magnitude of which may be determined as described herein) the error resulting from the height to volume conversion may be contained within acceptable limits. Further, the volume function derivative may be estimated accurately because the system can collect a large number of data points, which may be stored in a compressed format as described in detail in the previously incorporated '664 patent, and because the system avoids delivery calculation errors. As in the case of calculating the volume of product in a single tank, the sales, volume and tank height measurements must take place simultaneously, the calibration of individual meters must be monitored and recorded, and a large volume of data must be collected and recorded.

Figure 2:
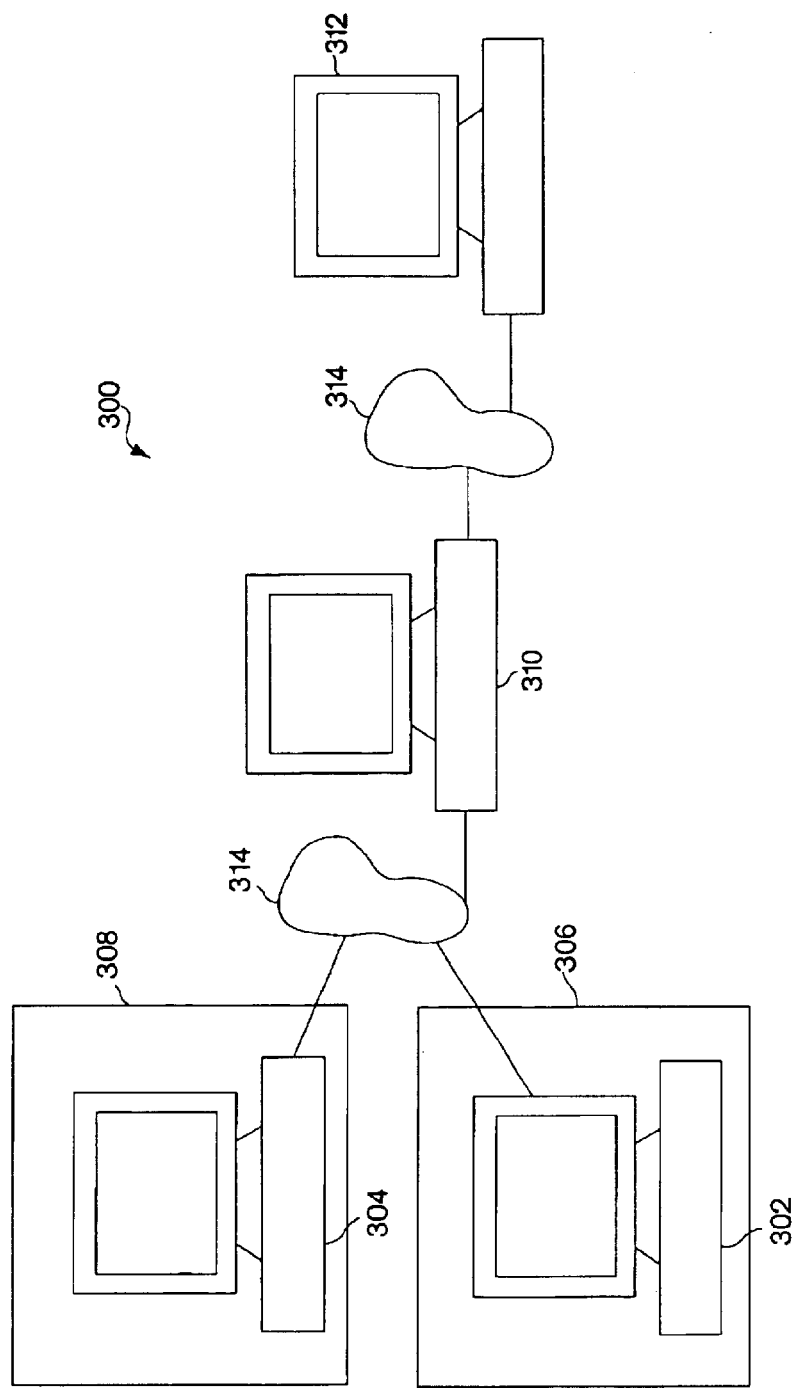
FIG. 2 is a schematic diagram of a data acquisition and transmission network that may be used in conjunction with the present invention.

Referring now to FIG. 2, the invention incorporates a data acquisition and transmission network (DAT network) 300 to completely automate the process of obtaining, capturing, transferring and processing product inventory data for use in product management, delivery scheduling and environmental compliance practices. DAT network 300 includes on-site processors 302, 304 at the facilities 306, 308 where the tanks are located, a customer host processor 310 and a central host processor 312. DAT network 300 links multiple remote facilities 306, 308 to central host processor 312, which performs the SIR analysis. The link may be accomplished indirectly through customer host processor 310, which itself is connected to a plurality of remote facilities 306, 308. Each of these processor elements is composed of independently operating software and hardware systems which form the basis of a wide area network linked by modems which transmit information electronically via the telephone or communications network 314 using standard dial-up voice grade telephone lines, satellite or cellular communication, POTS lines, or broadband access. Examples of DAT networks are the TeleSIRA and EECOSIRA systems developed by Warren Rogers Associates, Inc., Middletown, R.I. and the PetroNetwork S3 system developed by Warren Rogers Associates, General Partnership of Nashville, Tenn.

DAT network 300 provides a uniform method of integrated management for the widest possible variation of underground and above-ground fuel storage, movement and measurement systems. On-site processors 302, 304 are capable of obtaining information from any electronic or mechanical control system, enabling DAT network 300 to accommodate facility configurations that are unique to each facility while presenting the information captured at remote facilities 306, 308 to customer host processor 310 or central host processor 312 in a uniform format.

On-line processors 302, 304 obtain and capture product inventory data through the use of proprietary interfaces with external systems in use at remote facility 306, 308, such as tank gauges and sales recording devices. On-line processors 302, 304 transfer captured information daily, weekly or monthly through the public switched telephone network 314 to customer host processor 310 or central host processor 312 for use in inventory management, delivery scheduling and/or environmental compliance. On-site processors 302, 304 may be, e.g., touch-tone telephones acting as sending units and Windows-based multi-line, voice prompt/response PC's as the receiving units. On-site processors 302, 304 may be designed to meet the specific needs of facilities 306, 308 without requiring remote hardware at the facility in addition to that already present.

In particular, each of on-site processors 302, 304 may be equipped with an alphanumeric keypad, a character display, a power supply, multiple programmable serial ports, multiple discreet inputs, multiple discreet outputs, a local printer port (for connection to a printer) and one or more communication ports capable of supporting remote communication. Additionally, each of on-site processors 302, 304 may be equipped with a telecommunication means. Examples include but are not limited to internal or external auto-dial/ auto-answer (AD/AA) modem and/or internal communication support that accesses broadband, narrowband and/or wireless low-speed or high-speed communications connections of any type. The keypad and display allow for operator configuration and manual entry of sales, delivery, tank level, or supplemental data.

While use of an AD/AA modem allows an on-site processors 302, 302 to share an existing telephone line with other devises that use the same line by establishing communications windows, or use distinctive ring or use intelligent answering devices to minimize attempted simultaneous use or simultaneous answer. The use of any type of telecommunication means that supports an "always on connection", examples include but are not limited to cable, any form of DSL, Frame Relay, ISDN or Satellite, will enable frequent or continuous communication to be maintained. Each of the programmable serial communications ports is independent, fully programmable and governed by options selected at the facility or off-site through remote configuration access. Finally, on-site processors 302, 304 can prompt the facility operator to enter or verify missing, corrupted or suspect data by manual entry when results of a screening procedure or analysis is performed, either on-site or off-site, on the data automatically captured and the results of the screening or analysis are outside the expected range or when supplemental data is required to complete the analysis.

The use of customer host processor 310, which is capable of receiving, storing and processing information from multiple on-site processors 302, 304, enables the management of a remote tank population from a single point of contact. A database of information created by customer host processor 310 is the basis for all higher level product management functions performed by DAT network 300. The database is also the basis for the environmental compliance analysis performed by central host processor 312.

The use of central host processor 312, which is capable of receiving, storing and processing the information in the database created by customer host processor 310 for product management enables DAT network 300 to achieve maximum results by utilizing the database for environmental compliance without additional remote facility information or communication. Central host processor 312 is capable of transmitting a resulting database of the environmental analysis back to customer host processor 310 for printing and other customer record-keeping requirements.

The processor elements of DAT network 300 may exhibit other useful operational characteristics. To prevent unauthorized access to DAT network 300, a security access code for dial-up data transfer functions is required. Under secured access, the baud rate, parity, stop bit parameters and communication protocol are determined at any of on-site processors 302, 304, customer host processor 310 or central host processor 312.

Another function of DAT network 300 is to monitor tank contents generally. DAT network 300 can be programmed to activate, e.g., an audible and/or visual alarm if the water level in the tank is too high (e.g., greater than 2 inches), if the product level in the tank is too high (e.g., more than 90% of tank capacity) or too low (e.g., less than 10% of tank capacity, more product must be reordered, or less than two days supply), and if a theft occurs (product level changes during quiet periods).

The system may be used to obtain valuable information other than inventory regulation and leak detection. For example, the system may incorporate time series analysis routines, including Box Jenkins, moving average and exponential smoothing, to derive estimates of demand for the product which also incorporate temporal and seasonal trends and special events.

The demand analysis may also be combined with additional inputs of holding costs, reorder costs, transportation costs and penalty costs for running out of stock. The system can include optimal inventory algorithms to determine optimal order quantities, reorder points and optimal delivery truck routing. Further, the system may incorporate multiechelon, optimal inventory procedures to accommodate combined wholesale and retail operations, such as with calculus-based optimization and linear, nonlinear and dynamic programming.

Figure 3:
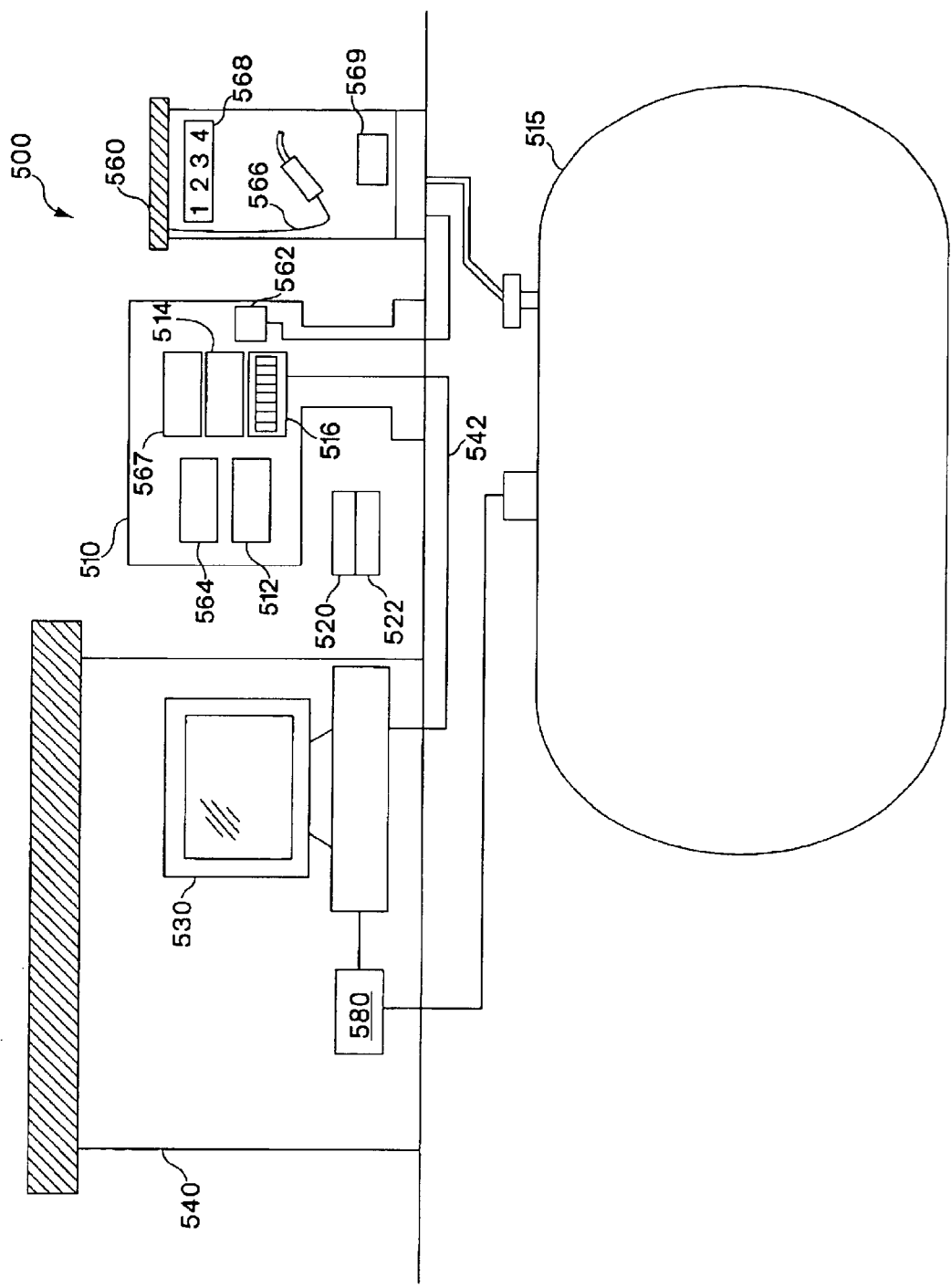
FIG. 3 is a schematic diagram of an underground storage tank facility including a fuel access control unit.
Figure 4:
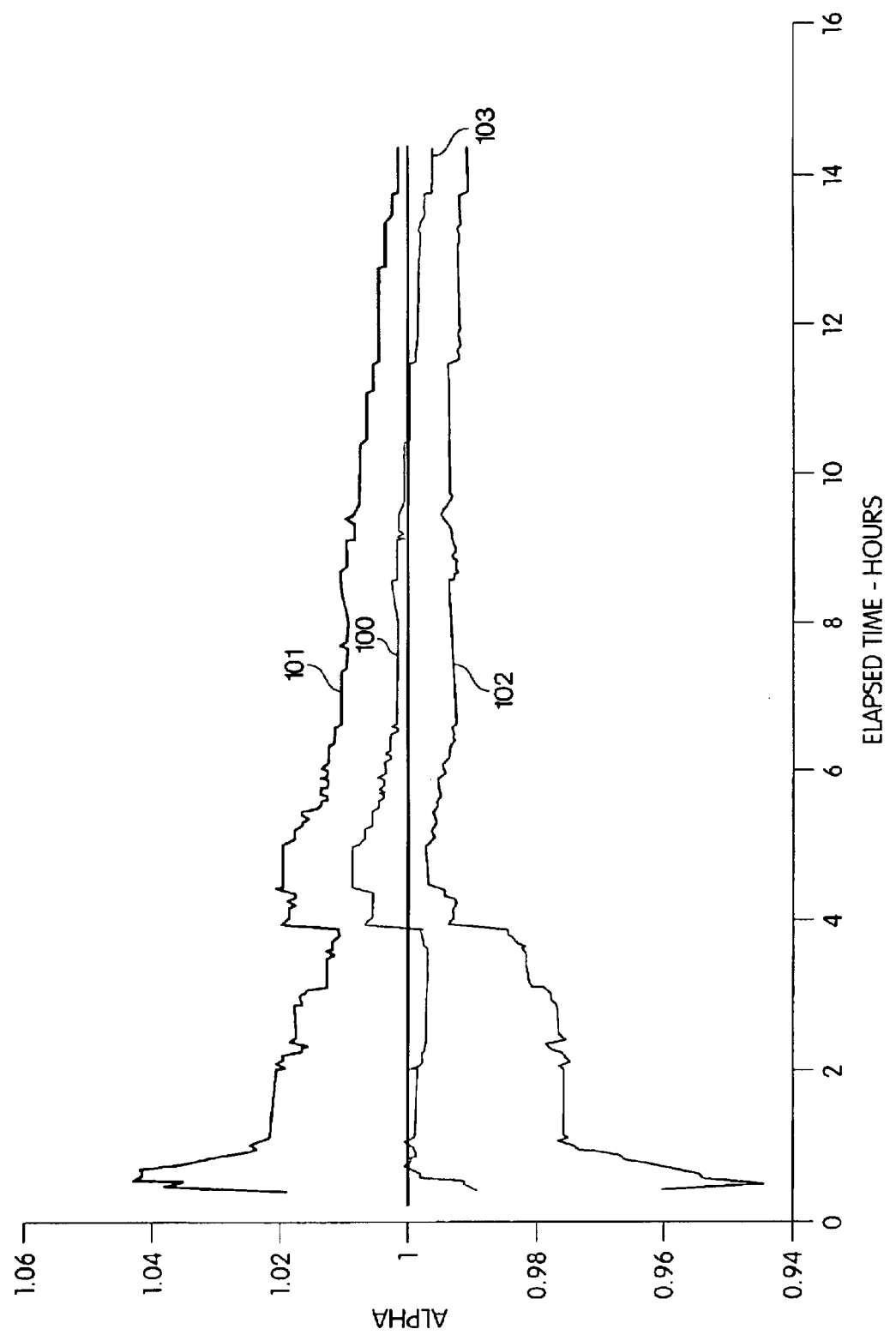
FIGS. 4–15 are graphical illustrations of meter calibrations calculated using the disclosed method based on empirical data collected from a controlled liquid storage and distribution system.
Figure 5:
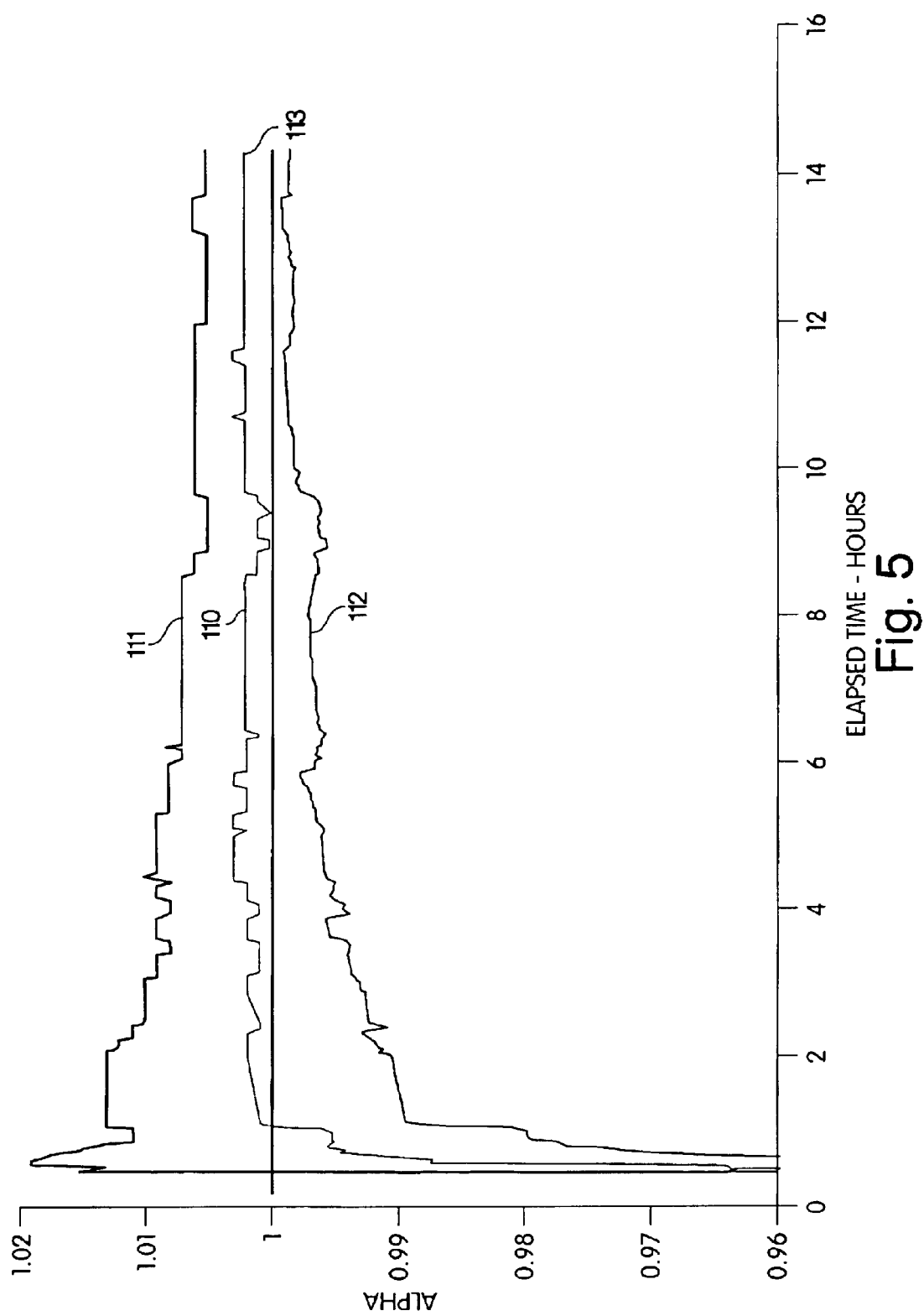
Figure 6:
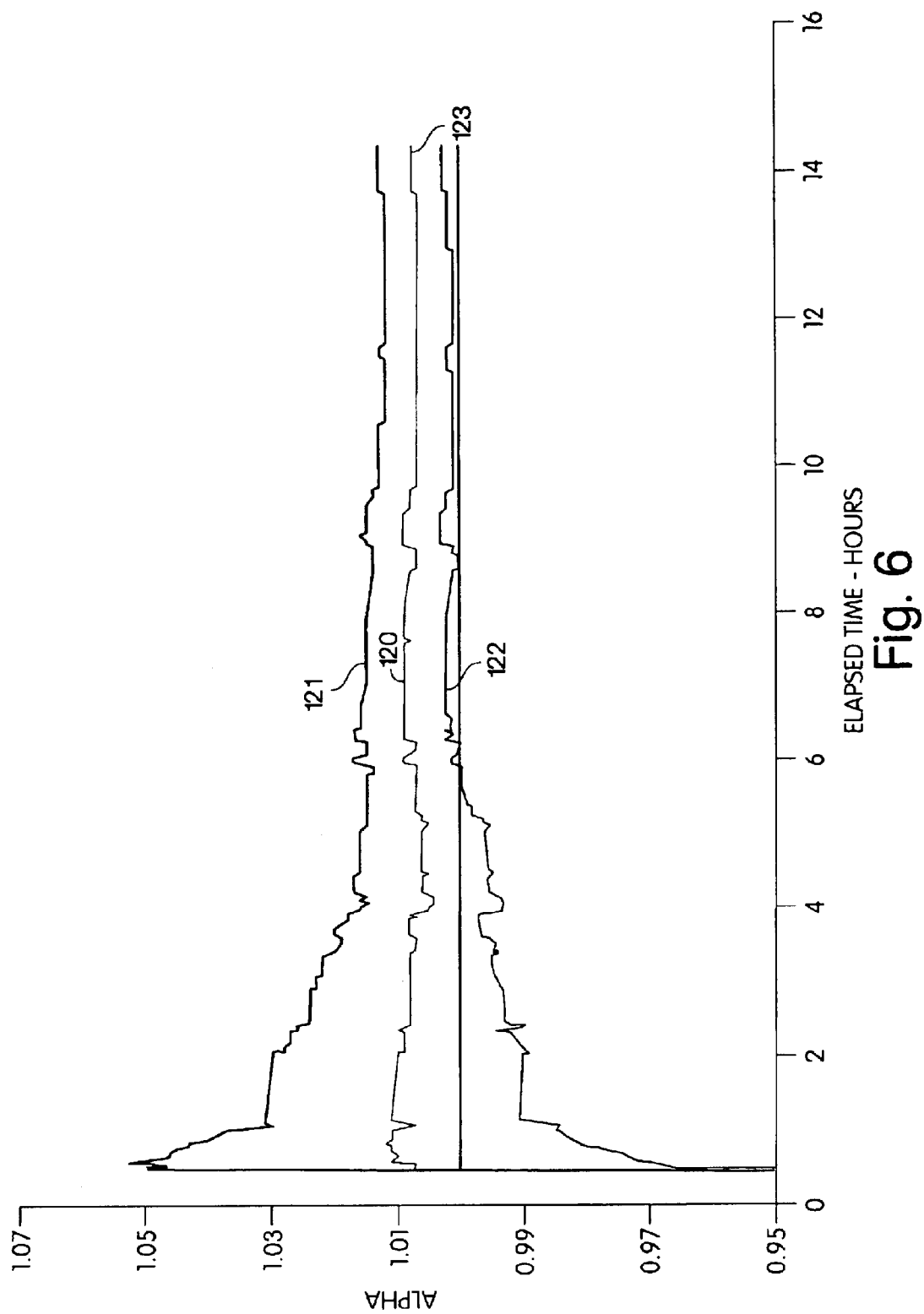
Figure 7:
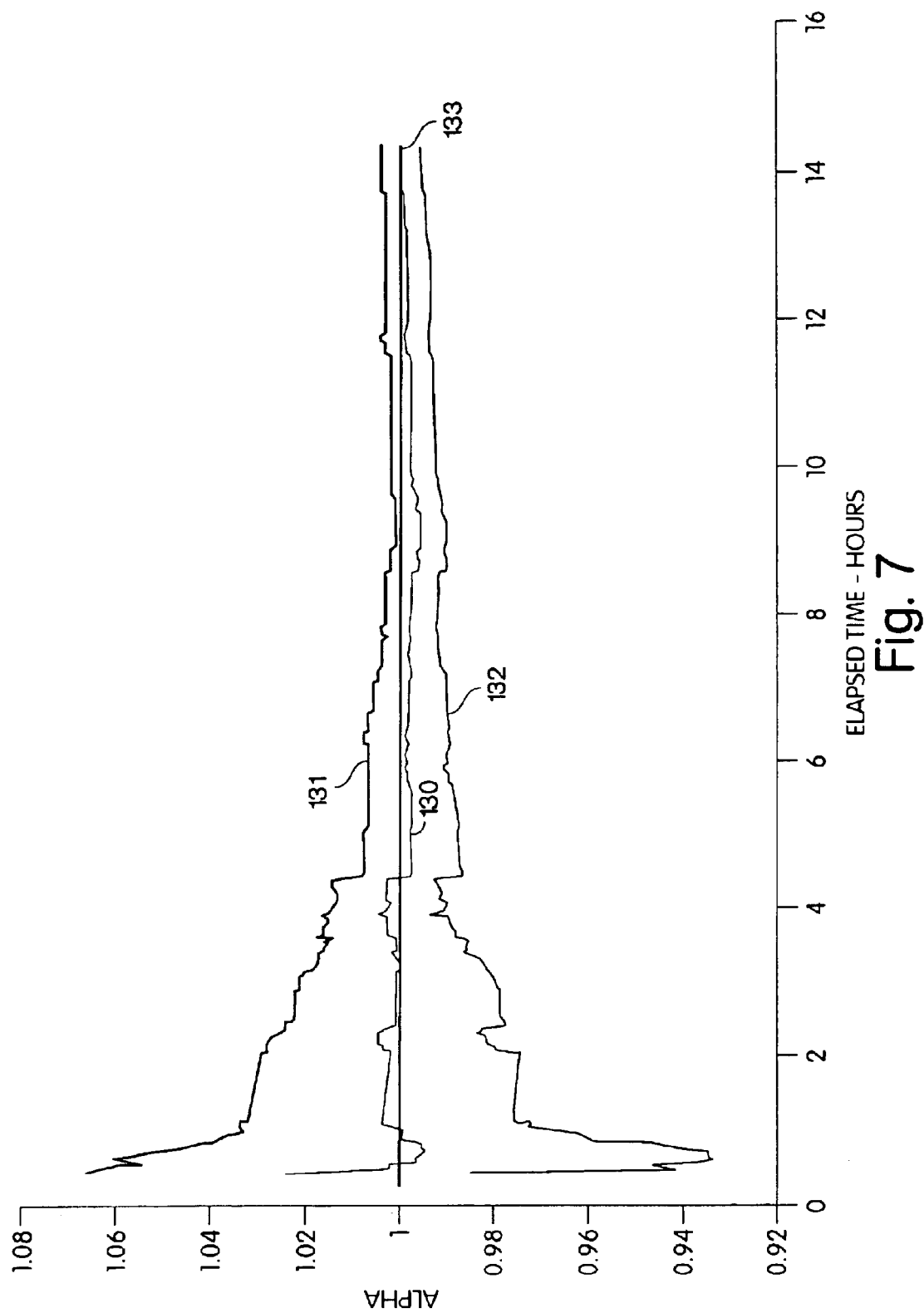
Figure 8:
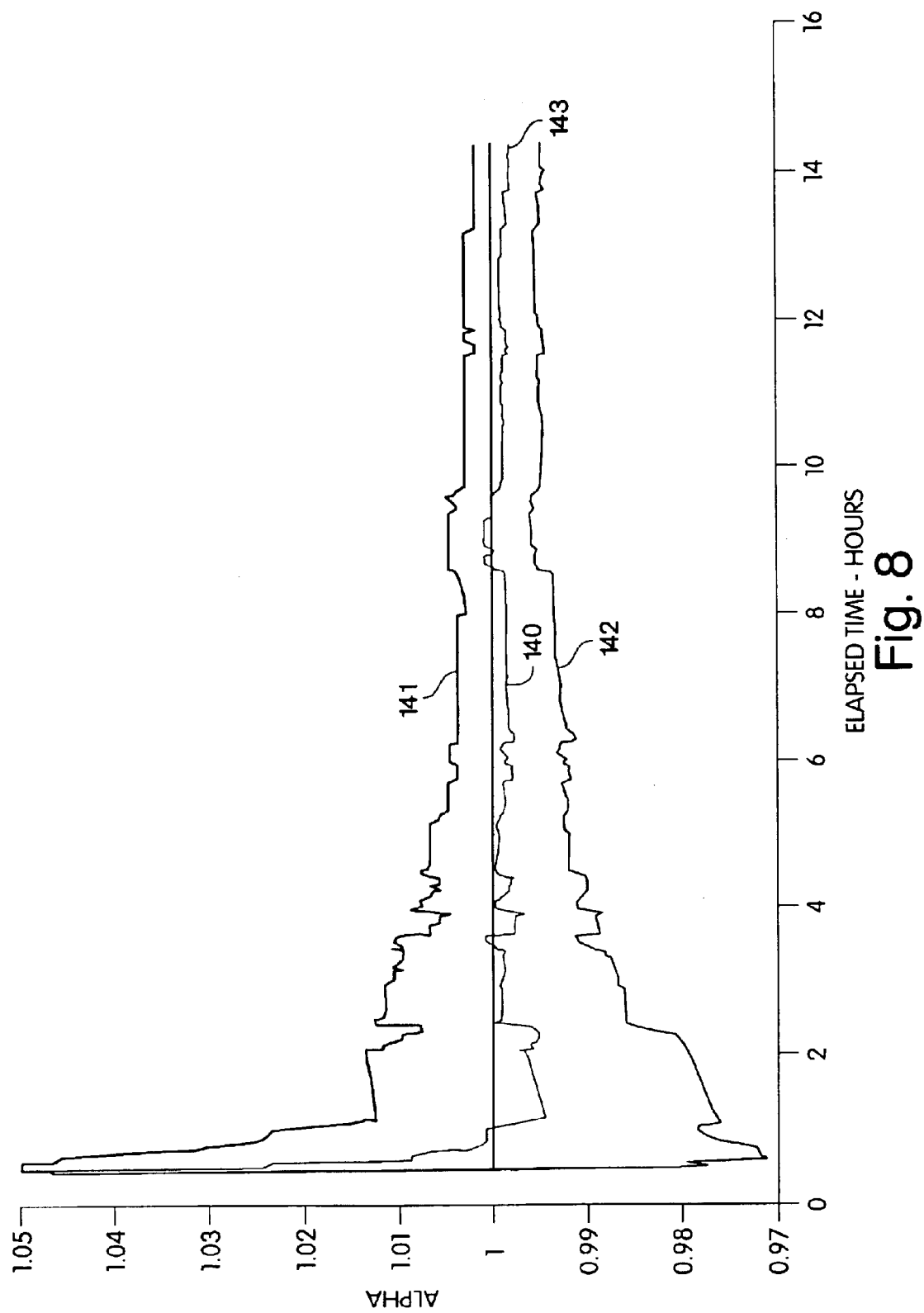
Figure 9:
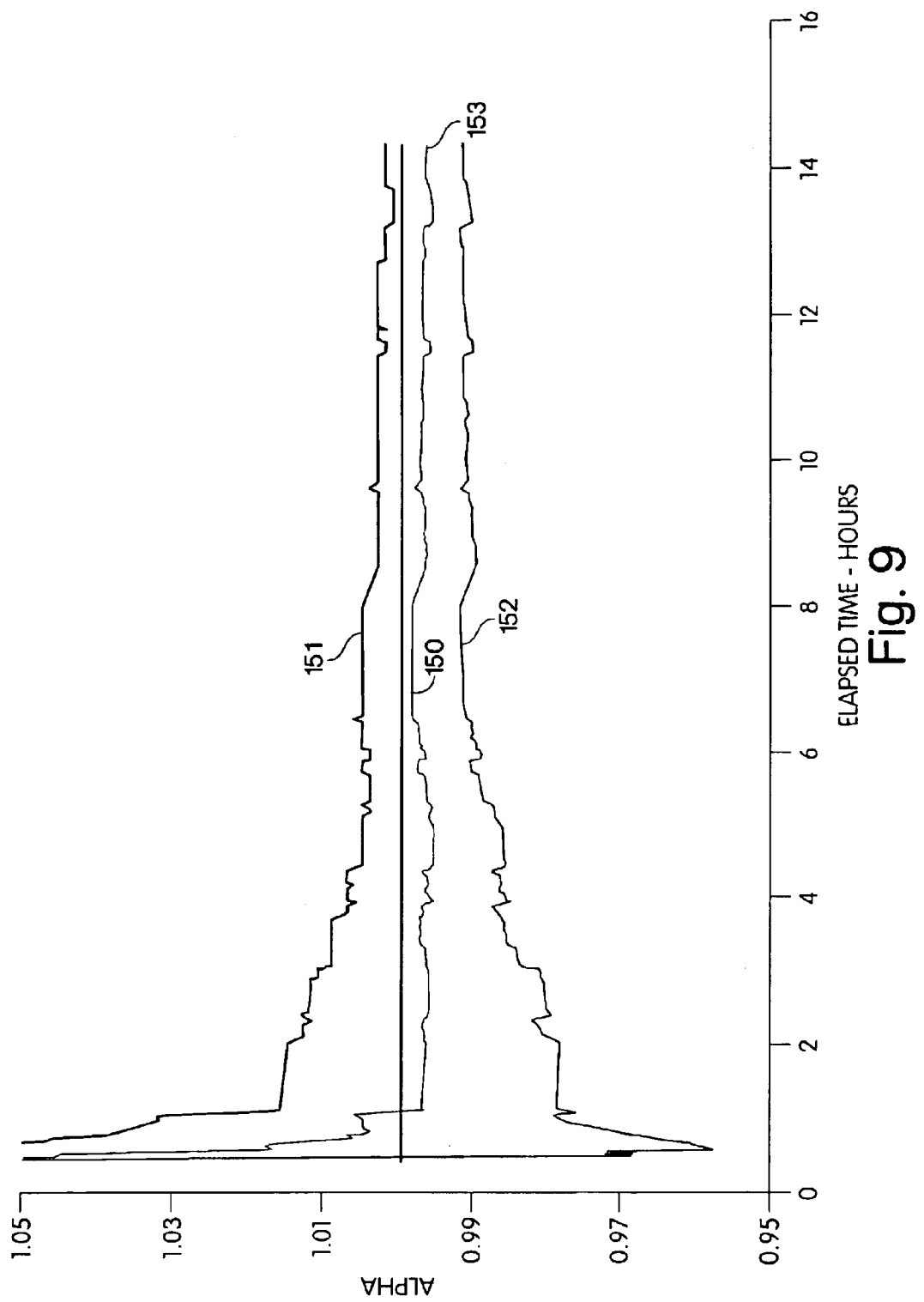
Figure 10:
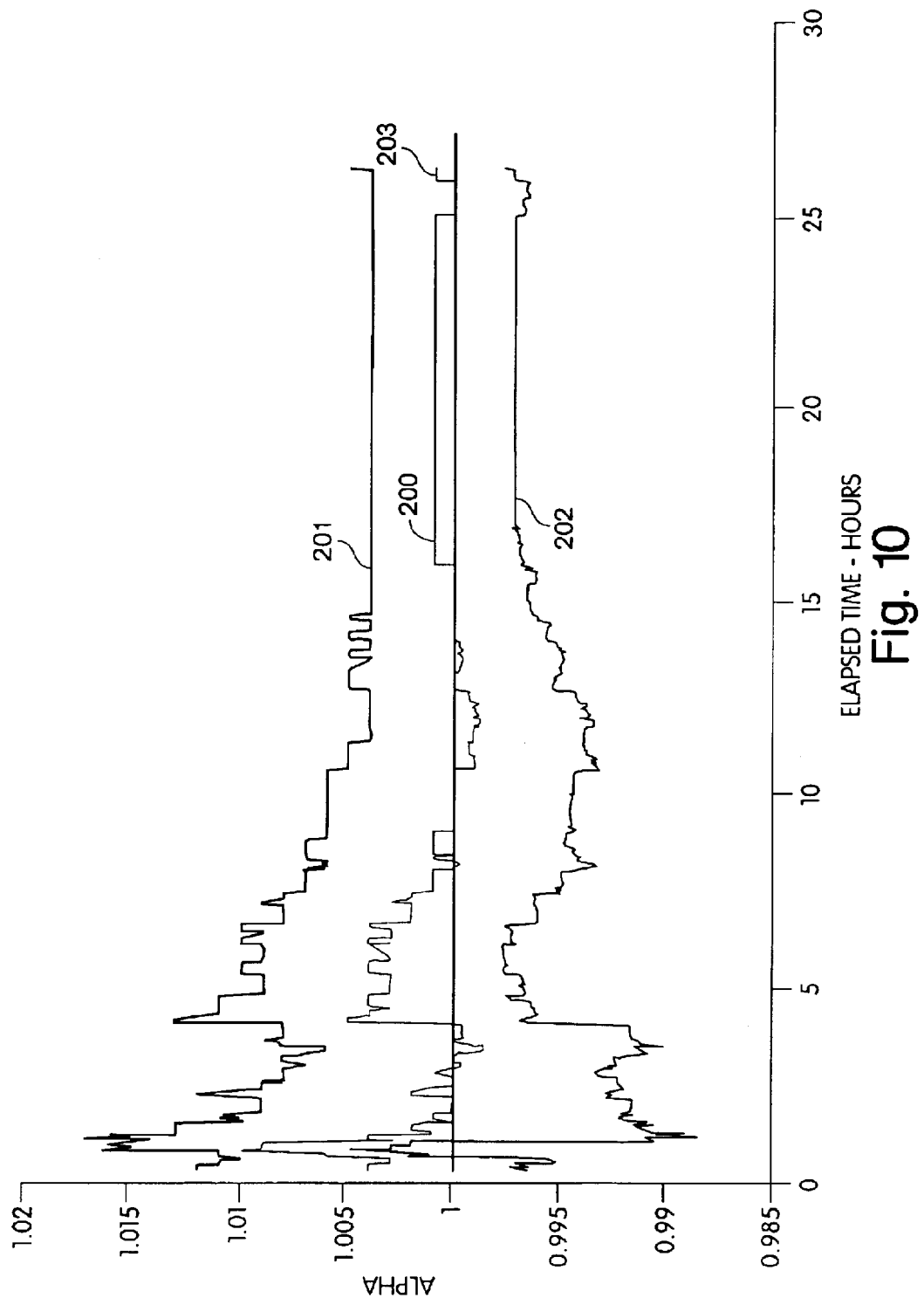
Figure 11:
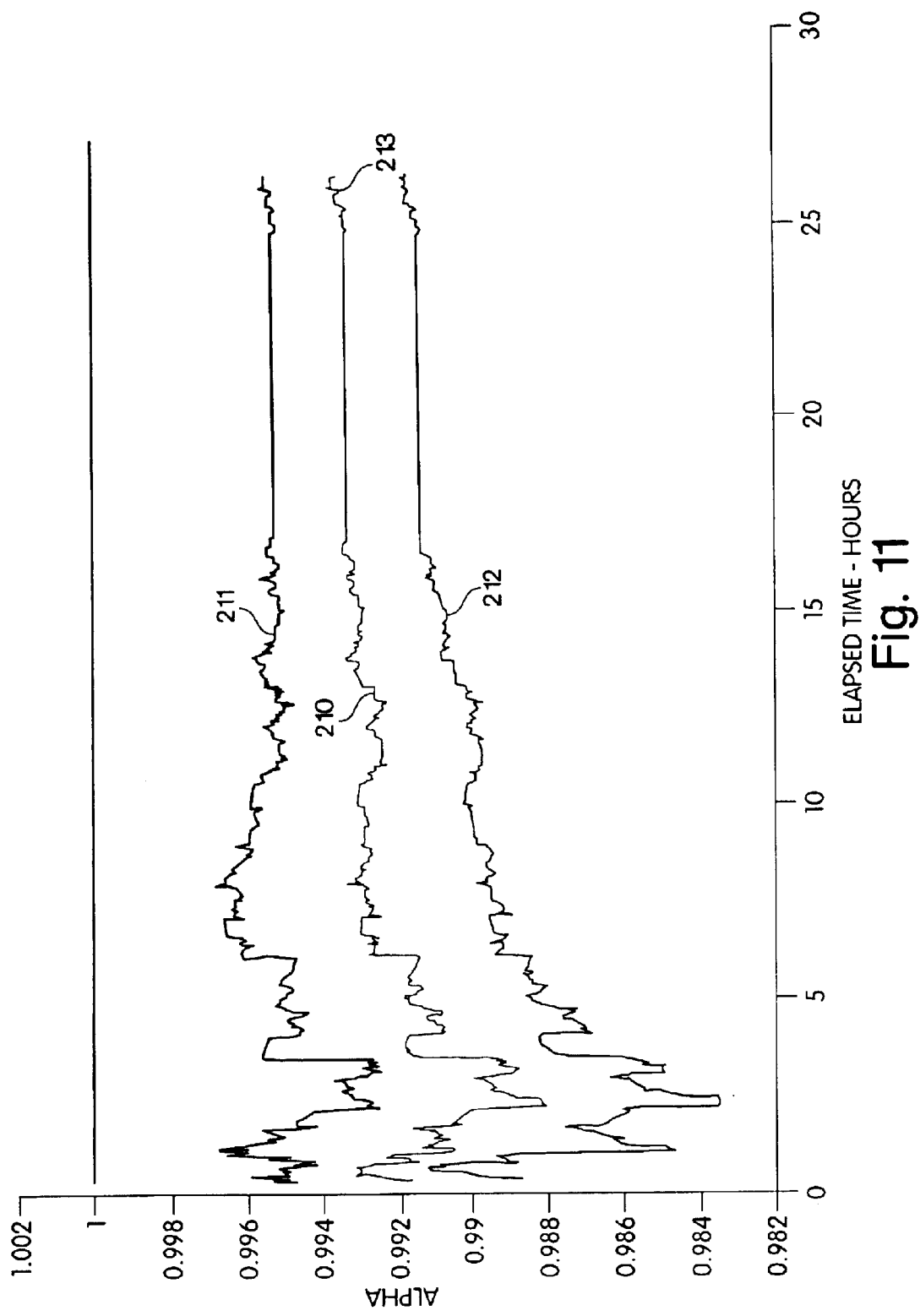
Figure 12:
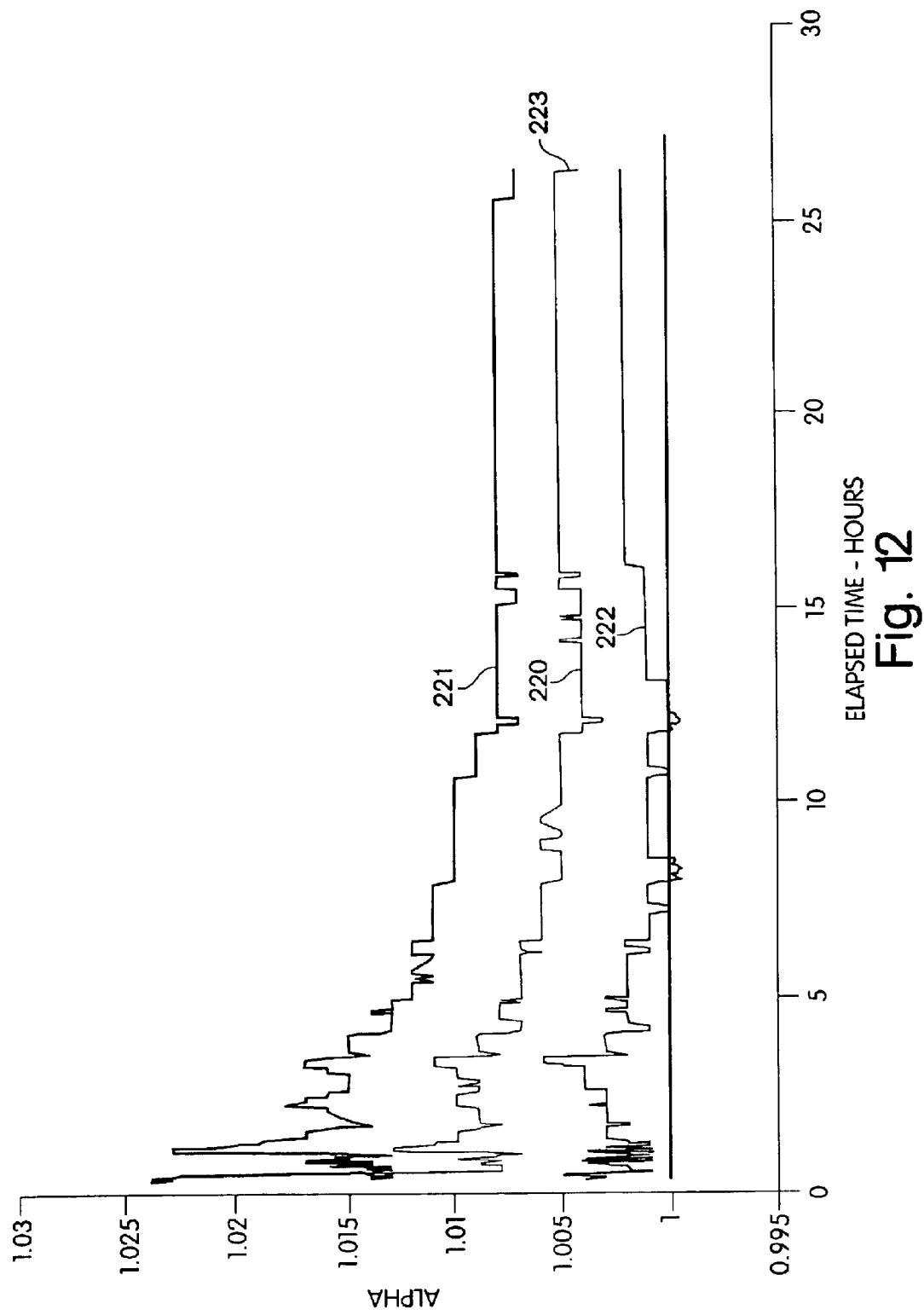
Figure 13:
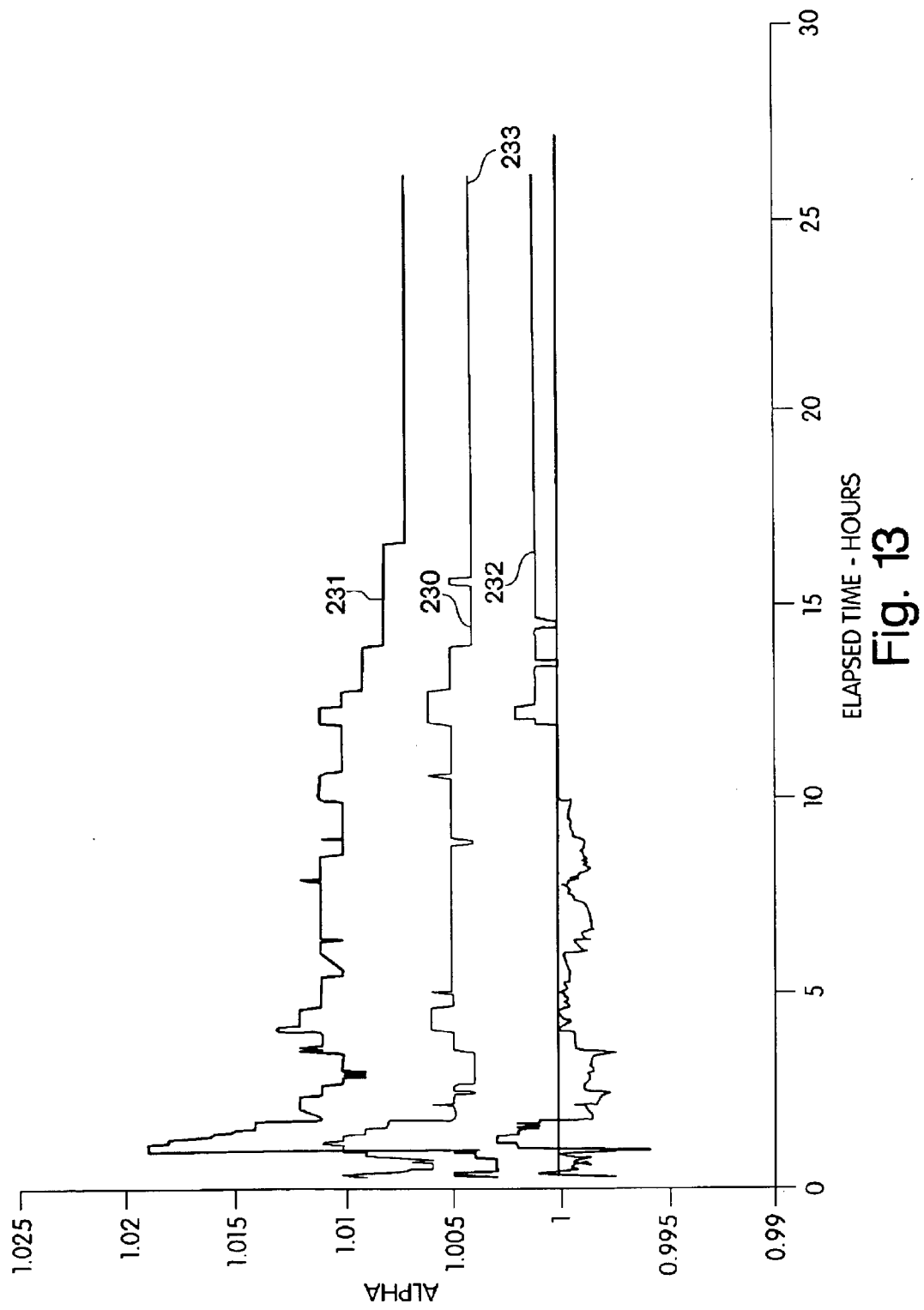
Figure 14:
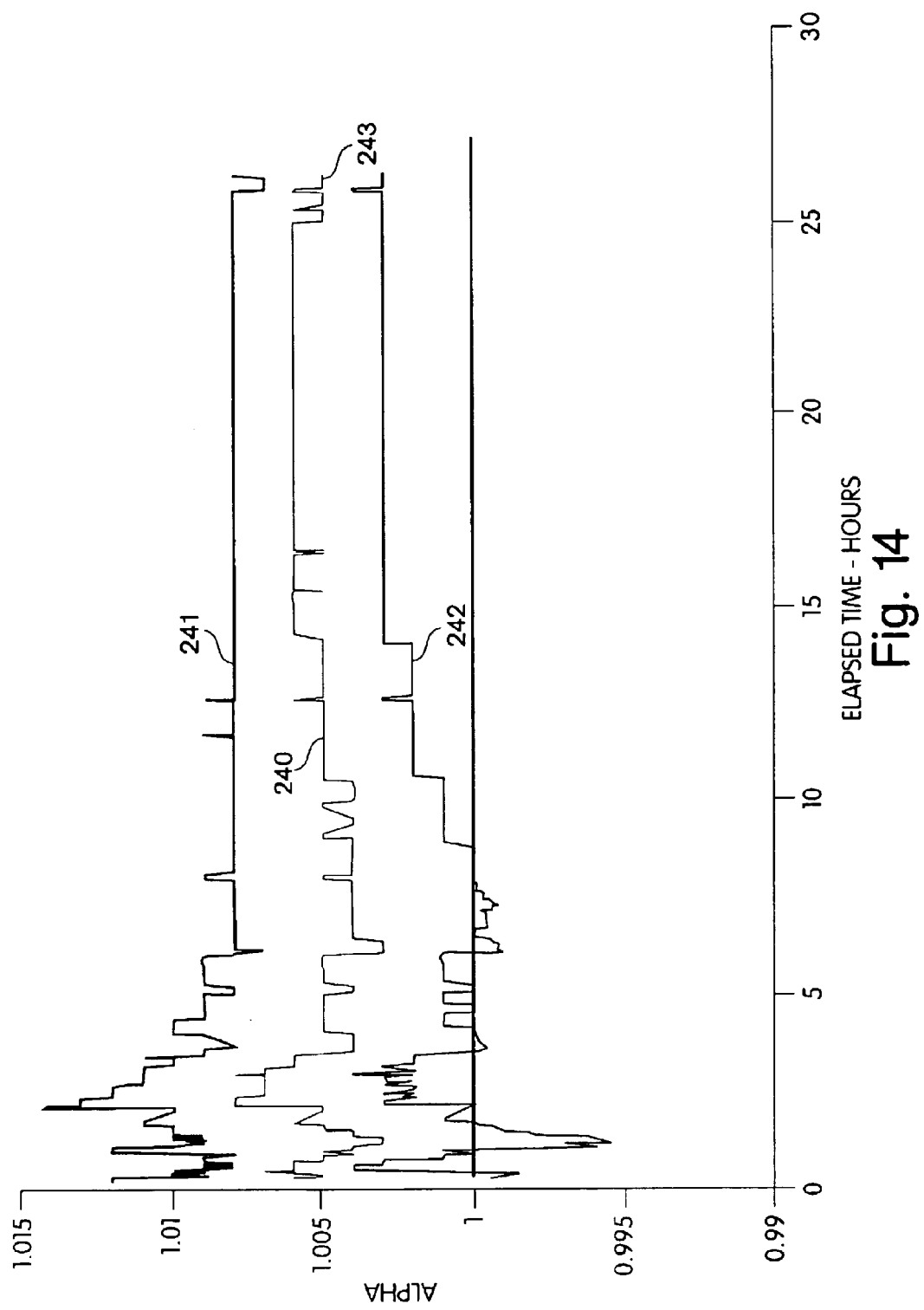
Figure 15:
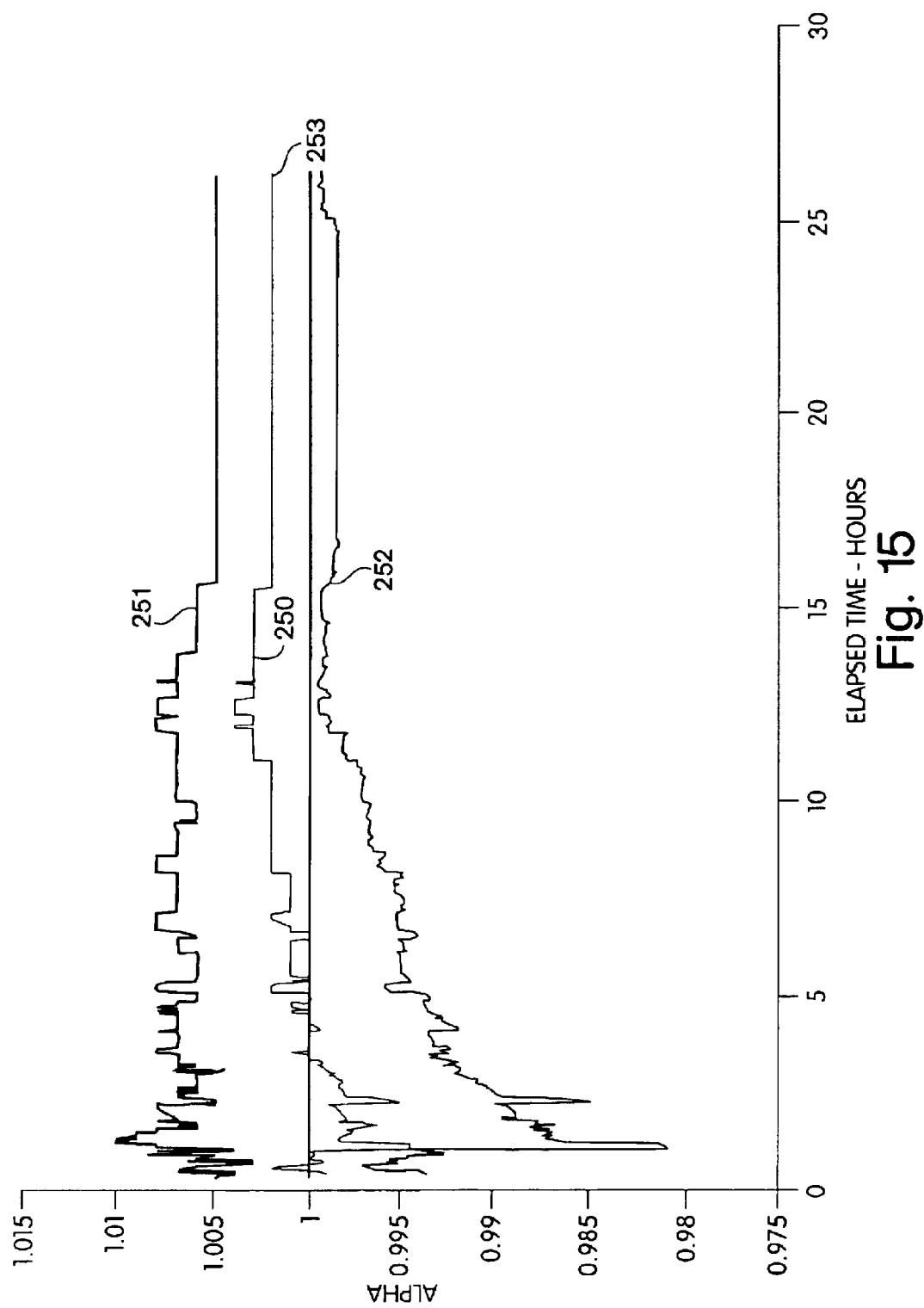

As shown in FIG. 3, a DAT network may include a fuel access control unit or system 510 at a storage tank facility 500 such as a UST automobile fueling facility. Fuel access control unit 510 is a dispensing system actuated by the use of a device coded with information, e.g., a card 520 with a coded magnetic stripe 522, e.g, an optical punched card, an electrically erasable programmable read-only memory (EEPROM) key, a radio frequency identification (RFID) tag, a magnetic resonance coupler, a bar code, or other type of coded medium which contains identification information pertaining to the user. Fuel access control unit 510 may include apparatus for a user to input information, e.g., a card reader 512, a display 514, and a keypad 516, a control system 562 for turning a fueling dispenser 560 on and off, and a processor 564 or similar computing platform for controlling and monitoring the user's fueling process. Manufacturers of fuel access control system which rely upon optical reading devices or magnetic stripe card reading devices to identify the user include FillRite, Fuel Master, Gasboy, PetroVend and Trak Engineering.

Fuel access control unit 510 is used to monitor the activity of fueling dispenser 560. Fueling dispenser 560 includes a hose 566 for dispensing fuel from a tank 515, a totalizer 568 and a meter 569 for measuring the volume of fuel dispensed by hose 566. Fuel access control unit 510 may communicate with an on-site processor 530 located inside facility building 540 over a local area network (LAN). The communications between fuel access control unit 510 and on-site processor 530 may be over RS-232/RS-485/RS-485 (MultiDrop) cabling 542.

Fuel access control unit 510 provides a system of controlling access to fueling facility 500 by determining the identity of each user of the facility and screening each user based on his or her authority to purchase fuel. Identification of the user is made by requiring the user to present a valid magnetic card (e.g., card 520), an optical punched card, an EEPROM key, an RFID tag, a magnetic resonance coupler, a bar code, or other type of coded medium, which contains identification information pertaining to the user. Such fuel access control systems are referred to as island control units or cardlock system. Further, the user may be required to present additional identifying data by other means such as buttons, key switches, or by entering information on keypad 516. Once the identification data is collected, fuel access control unit 510 determines the user's fueling privileges, and based on this information will either allow or deny fueling by the user. If fueling is allowed, fuel access control unit 510 will enable dispensing pump 560 for that particular user and monitor the fueling process. At the completion of the fueling process, fuel access control unit 510 will record the amount of the fueling transaction in a memory 567 and retain the recorded information for further accounting of the transaction.

Fuel access control unit 510 may be used to perform a variety of functions, including the following:

1. Identifying the user by reading a card or other coded medium and collecting the user's identification information such as a driver license number or other personal data.
2. Collecting other pertinent data for analysis, such as an identification of the user's vehicle, the vehicle's odometer reading, a trip number, the trailer hub counter, the engine hour reading and/or a refrigerator unit hour reading.
3. Making authorization decisions, to determine whether the identified user is permitted to obtain fuel.
4. Enabling fueling by enabling the proper dispensing pump for the user.
5. Monitoring fueling by controlling the maximum amount dispensed.
6. Turning off the dispensing system if no fuel is dispensed for a predetermined period of time.
7. Recording the fueling transaction by storing the final amount of fuel dispensed.
8. Reporting the fueling transaction to a processing location for inventory analysis or other analysis.

There are two types of authorization procedures for determining whether an identified user is permitted to obtain fuel from a fueling facility. Fuel access control unit 510 may use either or both of these authorization procedures. For the first method of authorization, external authorization, fuel access control unit 510 collects the user's information and forwards the collected information to an outside agent to make a final decision as to whether or not the identified user is permitted to obtain fuel from fueling facility 500. The outside agent may return an approval, along with fueling parameters (i.e., a maximum amount), or a denial. Fuel access control unit 510 will then inform the user whether or not fuel may be obtained. The outside agent may be connected to fuel access control unit 510 via a dial-up telephone line, a LAN or a direct communication link.

For the second method of authorization, internal authorization, fuel access control unit 510 collects the user's information and compares the collected information to a data table stored locally to make the final decision as to whether or not to allow fueling. The locally stored table may return an approval, along with fueling parameters (i.e., a maximum amount), or a denial. Fuel access control unit 510 will then inform the user whether or not fuel may be obtained. The locally stored table may be housed directly in fuel access control unit 510, in a control device at the fueling facility such as on-site processor 530 or carried on the access medium (e.g., card 520) used to request fueling authorization. The locally stored table may also be imbedded directly in fuel access control unit 510 or accessed via a LAN inside the fueling facility's building 540.

Fuel access control unit 510 functions as an additional point of sale (POS) device, similar to sales recording device 71 (FIG. 1). Fuel access control unit 510 responds to requests for hose status and totalizer and meter values in the same manner as a POS device. Fuel access control unit 510 also monitors each hose 566 and tracks status changes in the hose, including indications that the hose is idle, that a request for access is in process, that the use of hose 566 has been authorized, that the hose has been taken off its hook, that dispensing pump 560 is dispensing fuel with hose 566 removed from its hook, and that the dispensing pump has been turned off and the hose is idle again.

Each detailed transaction that is completed by fuel access control unit 510 may be retrieved by on-site processor 530 from memory 567 upon completion of the transaction. The transaction information may be stored in processor 530 for further analysis. Further, based on the stored, detailed transaction information, a detailed site dispensing audit can be performed. Such a site dispensing audit would determine whether the volume claimed to be dispensed by fuel access control unit 510 actually represents the volume change in the UST or AST during the same period as calculated by on-site processor 530.

In conventional cardlock applications as well as other transaction authorization procedures, the processing methods assume that the volume as determined by fuel access control unit 510 is accurate, but have no way of determining if any errors in calculating the volume have occurred. A fuel access control system interfaced directly with an on-site processor 530 that receives data from an automatic tank gauge 580 may also experience similar errors associated with conventional inventory control practices. By contrast, an enhanced, integrated fuel access control unit 510 may include an accurate analysis of the state of hose 566. Such an integrated fuel access control unit 510 may avoid the occurrence of dispensing pump 560 being properly accessed and enabled by authorization control system 562, but appearing not to be dispensing fuel. From the point of view of fuel access control unit 510, the user may have simply changed his mind about purchasing fuel. However, from the perspective of on-site processor 530, a determination can be made about the dispensing pump's activity by analyzing the tank activity and comparing that information to the activity of totalizer 568 and meter 569. Further, although other hoses may be actively dispensing fuel during the same period, on-site processor 530 may track all hose activity independently for analysis.

Turning now to meter error calibration, the disclosed methods offer advantages especially in fluid systems with high flow rates and multiple metering devices by reducing sensitivity to random noise in the data, thereby producing more stable results for a given volume of data. Particularly, the method addresses statistical instability caused when product is pumped simultaneously through more than one metering device. In the above described procedure of previously incorporated U.S. Pat. No. 5,757,664, amounts pumped through any one meter are recorded individually while the tank gauges measure only the total of all product pumped through all of the meters, e.g., by measuring the height of product in each system tank. The lack of uniqueness in the possible constituents of the total change in tank volume allows meter accuracy coefficients to vary in compensating ways to mimic or match the noise pattern in the data.

To reduce the compensating variations in meter accuracy coefficients, whenever multiple simultaneous quantities are metered the present method treats the sums of those simultaneously dispensed metered quantities as independent variables rather than treating the individual dispensed metered quantities as independent variables.

The calculations are performed as follows, based on a liquid storage system having m meters and using the following definitions:

$Sa_{ij}$=Volume dispensed through meter $i$ during period $j$ $i=1, 2, \ldots m$ $j=1, 2, \ldots N$ $N$=number of observed dispensing intervals $st_i$=measured volume in tank on completion of dispensing interval $i$.

Tank volume measurements are typically made only when all dispensing activity has ceased.

$\Delta st_i = st_{i-1} - st_i$ $\alpha_i$=fraction of metered volume from dispenser $i$ which is actually dispensed when dispenser $i$ is the only active dispenser Considering a dispensing interval j in which the quantities $sa_{ij}$ and $sa_{kj}$ are simultaneously dispensed from dispensers i and k, and letting $\alpha_{ik}$ be the fraction of the metered total $(sa_{ij}+sa_{kj})$ which is actually dispensed, then we define average volumes as follows:

$$\overline{sa_i} = \frac{\sum_{j=1}^{N_{ij}} sa_{ij}}{N_{ik}}$$

$$\overline{sa_k} = \frac{\sum_{j=1}^{N_{ik}} sa_{kj}}{N_{ik}}$$

where the sums are taken over only those observations containing simultaneous dispensing through meters i and k. $N_{ik}$ is the number of such events.

For consistency we require that $$\alpha_{ik}(\overline{sa_i} + \overline{sa_k}) = \alpha_i \overline{sa_i} + \alpha_k \overline{sa_k}$$

$$\alpha_{ik} = \alpha_i \frac{\overline{sa_i}}{(\overline{sa_i} + \overline{sa_k})} + \alpha_k \frac{\overline{sa_k}}{(\overline{sa_i} + \overline{sa_k})}$$

The regression equation for observations involving simultaneous dispensing from two dispensers i and k then becomes:

$$\Delta st_j = \alpha_i \frac{\overline{sa_i}}{(\overline{sa_i} + \overline{sa_k})}(sa_{ij} + sa_{kj}) + \alpha_k \frac{\overline{sa_k}}{(\overline{sa_i} + \overline{sa_k})}(sa_{ij} + sa_{kj})$$

This equation allows for conversion of the combined error coefficient, $\alpha_{ik}$, into its constituent into individual error coefficients, $\alpha_i$ and $\alpha_k$, for individual meters i and k.

In like manner, any r-tuple of meters with simultaneous metered dispensed quantities may be considered as follows:

$(sa_{i_1 j}, sa_{i_2 j}, \ldots, sa_{i_r j})$ $i_1 = 1, 2, \ldots, m-r$ $i_2 = i_1 + 2, \ldots, m-r+1$ $i_r = i_1 + r - 1, i_1 + r, \ldots, m$ This forms the r averages, $$\overline{sa_{i_s}} = \frac{\sum_{j=1}^{N_{i_1, i_2, \ldots, i_r}} sa_{i_s j}}{N_{i_1, i_2, \ldots, i_r}}$$

for $s = 1, 2, \ldots, r$ $N_{i_1, i_2, \ldots, i_r}$=number of observations of simultaneous dispensements through meters $i_1, i_2, \ldots, i_r$ and the regression equation for that observation becomes:

$$\Delta st_j = \sum_{k=1}^{r} \alpha_{i_k} \frac{\overline{sa_{i_k}}}{\sum_{s=1}^{r} \overline{sa_{i_s j}}} \left( \sum_{s=1}^{r} sa_{i_s j} \right)$$

The regression method for estimating $\alpha_1, \alpha_2, \ldots, \alpha_m$ then proceeds in the manner described in previously incorporated U.S. Pat. No. 5,757,664. As more fully described in that patent, the sets of observations of the various individual dispensing subsets along with their appropriate constant multipliers may be aggregated into a matrix of coefficients of the independent parameters, $\alpha_1, \alpha_2, \ldots, \alpha_m$. The parameters are then estimated by ordinary least squares regression. Other regression methods may be used.

The method treats the sum of simultaneously dispensed quantities as an independent variable but constrains the contribution to the values of the α's to be in proportion to the ratios of the average quantities dispensed from the relevant meter in this particular configuration to the average of the totals dispensed also from this specific configuration.

In a similar fashion, the method described above can be modified to determinate meter calibration accuracy while concurrently identifying storage system leakage As in the case of multiple simultaneous dispensements, evaluation under controlled conditions of the procedure described in U.S. Pat. No. 5,757,664 reveals that estimated leak rates and meter calibration discrepancies could become confounded with one another when the system is subject to random noise.

As in the former case, this happens because the measuring device in the tank records the sum of the effects and the lack of uniqueness in the constituents of the sum allows meter accuracy coefficients and leak rates to vary in compensating ways to mimic or match noise patterns in the data.

This problem can be overcome by a method analogous to that used to resolve individual meter accuracies, provided two conditions are met:

1. There must be periods of time when all meters are dormant and the lines are not pressurized; and
2. There must be periods when all meters are dormant, but lines remain pressurized.

Proceeding as before it is, assumed that there is one meter measuring the dispensed quantities $sa_i$ in each dispensing period $$i = 1, 2, \ldots, N$$

Let $st_i$ = volume of product measured during period $(i-1, i)$ $$\Delta st_i = st_{i-1} - st_i$$

$Et_i$ = elapsed time during observation period $i$

Combined tank and line leaks are viewed as an inaccurate virtual metering device, which discharge one gallon per hour from the tank. Therefore, during an observation interval, when product is dispensed, the real and virtual meters in total will have recorded $(sa_i + Et_i)$ gallons removed from the tank. The following variables and average values are defined:

$\alpha$ = fraction of product recorded on the meter which is actually removed from the tank.

$lst$ = actual tank leak rate in gallons per hour.

$lsl$ = actual line leak rate per hour $Nt$ = total periods of observation $Ns$ = total periods when volume is dispensed $$\overline{sa} = \frac{\sum_{i=1}^{Ns} sa_i}{Ns}$$

$$\overline{Ets} = \frac{\sum_{i=1}^{Ns} Et_i}{Ns}$$

The second sum is taken over all observations where the lines are pressurized. Then $\alpha sl$ = the fraction of the sum $(sa_i + Et_i)$, which is: actually removed from the tank during period i when product is dispensed.

For consistency, as in the case of multiple meter accuracies, the following relationship is required:

$$\alpha sl(\overline{sa} + \overline{Ets}) = \alpha \overline{sa} + (lst + lsl)\overline{Ets}$$

$$\alpha sl = \alpha \frac{\overline{sa}}{\overline{sa} + \overline{Ets}} + (lst)\frac{\overline{Etl}}{\overline{sa} + 2\overline{Etl}} + (lsl)\frac{\overline{Etl}}{\overline{sa} + 2\overline{Etl}}$$

The regression becomes:
A. For periods i when product is dispensed:

$$\Delta st_i = \alpha \frac{\overline{sa}}{\overline{sa} + 2\overline{Etl}}(sa_i + 2Et_i) + lst\frac{\overline{Etl}}{\overline{sa} + 2\overline{Etl}}(sa_i + Et_i) + lsl\frac{\overline{Etl}}{\overline{sa} + 2\overline{Etl}}(sa_i + Et_i)$$

B. For periods i when lines pare pressuriaced but no product dispensed:

$$\Delta st_i(lst + lsl)Et_i$$

C. For periods when lines are not pressurized:

$$\Delta st_i = lstEt_i \text{ otherwise}$$

Extension to multiple meters is straightforward. Virtual meters (i.e., leaks) are used with the other meters, and elapsed time is used as the volume recorded on the virtual meter.

The requirement that periods of time exist when no product is dispensed will in most, if not all, retail sales applications be met by normal inter-arrival customer delays. The requirement that lines remain pressurized for some time when no product is dispensed requires a modification of the mechanism described in U.S. Pat. No. 5,757,664 to perform a Separation Diagnostic Test (SDT), as follows.

A separation mechanism is required because the flow measurement of a meter's error and a line release occur simultaneously and only when a submersible pump pressurizes the piping system. Further, a line release by its nature only flows when the submersible pump is maintaining the piping system pressure and ceases to flow when the submersible pump powers down, because the line quickly drops to zero pressure, and the line release stops.

The SDT requires a discrete input that monitors the state (e.g., open or closed) of the control relay used to switch submersible pump power. This input is normally a 115 VAC control coil in the normally open position and is used by major submersible pump manufacturers including, e.g., Tokheim, Red Jacket and F.E. Petro. The control coil is activated by the dispenser control handle switch and is held in the closed position as long as one or more dispenser handles of the same grade or tank are in the "on" position. When all dispenser handles of the same grade or tank are in the "off" position, the relay returns to its normally open (off) state.

The SDT requires a discrete control output that activates the submersible pump when required by the SDT and uses the same phase of 115VAC control power used by the dispenser handles. SDT submersible pump control is automatically deactivated when the SDT input detects a control voltage input from the dispenser handle indicating a fueling position is about to activate.

Referring now to FIGS. 4–15, a series of meter calibration calculation trials was conducted according to the above-described method. The trials were carried out on a controlled system consisting of a single storage tank and six metered dispensers (meter numbers 1–6). The controlled system allows physical determinations of, e.g., tank volume or stored liquid volume, to be readily and accurately obtained to limit unknown variables in the calibration method testing. Following system set-up, including verification that the test system was truly closed, i.e., no leaks were present and that test equipment was operating properly, introduction of an anti-foaming agent to the fluid, calibration of tank geometry and proving can tests were conducted.

Proving can tests, a traditional means of checking meter accuracy, include dispensing fuel through each metering device into a container having pre-marked volume levels (measured, for example, in cubic inches or milliliters) adjacent a transparent portion of the outer container surface. After dispensing fuel through a particular metering device until the registered values recorded by the totalizer associated with the meter reach a desired readout quantity, the volume in the marked container is determined by viewing the meniscus of the fluid relative to the pre-marked volume levels on the container. If the fluid reading on the proving can differs from the registered totalizer values or difference in registered totalizer values, the miscalibration of the meter is apparent.

In the controlled system used to obtain the test results discussed below, proving can tests were conducted using a five gallon (1155 cubic inches) proving can to determine actual dispensed volume variance from a five gallon meter reading. The variance of the actual volume dispensed from the five-gallon meter reading was measured in cubic inches. In such a proving can calibration test, meter error can be determined by dividing the variance reading from the proving can by the overall metered volume reading. A meter error coefficient (i.e., meter alpha value) can then be calculated by adding resulting meter error to one; i.e., for a meter error reading of zero (no error) the alpha value equals one (no correction necessary). For example, if a positive variance of one cubic inch is read on the proving can for a five gallon associated meter reading, the calculated alpha value is 1.00086 ((1 cu. in./1155 cu. in.)+1).

The following tests were conducted on the controlled system resulting in the corresponding data shown in the charts. The "Actual Meter Calibration" results represent the results of a proving can test (as described above) conducted prior to and after each "event".

The tests were conducted by disbursing stored liquid through the metering devices in a random fashion such that, in at least some cases, periods of simultaneous disbursement from multiple metering devices overlapped. On each occasion that a metering device concluded a period of liquid disbursement and no other metering device was disbursing liquid, data from each meter reading and from the liquid storage tank was collected and stored. Based on this data, meter calibration calculations were performed as described above.

The following tests were conducted:

Event A:

In this event, meter number 3 was intentionally miscalibrated to result in a proving can test reading of positive ten cubic inches (+10). Similarly, a positive five cubic inch (+5) miscalibration was imposed on meter 2 and a negative five cubic inch (−5) miscalibration was imposed on meter number 1. The meters were randomly cycled and data was collected as described above. The following data summarizes the data recorded.

| Meter Number | Start Totalizer (gallons) | End Totalizer (gallons) | End Totalizer (gallons) | Actual Meter Calibration (cubic inches) | System Check |
|---|---|---|---|---|---|
| 1 | 67967.2 | 91997.4 | 82435.1 | −5 | No Leak |
| 2 | 146976.8 | 213853.2 | 187376.7 | +5 | No Leak |
| 3 | 85178.8 | 114753.8 | 103523.6 | +10 | No Leak |
| 4 | 75957.9 | 106950.8 | 90610.0 | +0 | No Leak |
| 5 | 111295.1 | 173066.9 | 143815.6 | −2 | No Leak |
| 6 | 79726.2 | 109516.5 | 98093.9 | −1 | No Leak |

FIGS. 4–9 illustrate the results of the statistically calculated meter calibrations for individual meters 1–6, respectively. The statistical calculations were performed using the method disclosed above and were based on the data collected during the test.

Referring specifically to FIG. 3, for example, line 100 represents the calculated alpha value of meter 1 over the time period of the test. Upper and lower confidence bound lines, 101 and 102, calculated as described above, appear above and below alpha value line 100. As illustrated, the calculated alpha value becomes more stable over time as additional data is collected and incorporated into the regression analysis. Furthermore, the band between upper and lower confidence bounds 101, 102 tends to narrow over time as the calculated alpha value becomes more stable.

In the example of meter 1 for test event A, the imposed negative five cubic inch/five metered gallon error led to a known alpha value of 0.995700 (calculated from proving can test method described above). Statistically calculated results 100 in FIG. 3 demonstrate approximate correspondence between the physically measured result and the statistically calculated result. The correspondence becomes more accurate over time as the amount of collected data increases, as illustrated at end 103 of results 100.

Similar calculated alpha values 110, 120, 130, 140 and 150 are illustrated for each of meters 2–6 in FIGS. 5–9, respectively. Similar upper and lower calculated confidence bounds 111 and 112, 121 and 122, 131 and 132, 141 and 142, and 151 and 152 are also illustrated in FIGS. 4–8 for the respective meters. The trend of improved results over time, based on increased data collection, are also observed in FIGS. 4–8.

Event B:

Meters 1 through 6 were adjusted to a condition of miscalibration, which was verified by "proving can" test results as reported in the "Actual Meter Calibration" column of the table itself. While the test runs were being conducted, supplemental testing of other features of the method was also performed. In the first supplemental test, an audit check was made to verify the values of a known delivery amount against the delivery amount calculated by the method. This was accomplished by dropping 500 gallons of fluid from a 500 gallon certified proving tank into the storage tank. A delivery amount of 499.9 gallons was calculated by the above described method. After this first supplemental test, there was an interval in which the sole activity was continued cycling of fluid through the meters. The second supplemental test was to verify the capability of the method to identify the loss in the line that leads from a remote fill point to the tank. This second supplemental test was performed by conducting a gravity drop of product from the calibrated 500 gallon proving tank through an open T-connection that allowed the dropped fluid to flow freely to either of the supply or receiving tanks. Following this test, there was an interval in which the sole activity was continued cycling of the fluid through the meters. The final supplemental test was to verify the ability of the method to identify water incursion into the tank. This condition was replicated by dribbling five gallons of liquid into the tank over an interval of approximately forty five minutes. Following this supplemental test, continued cycling of fluid through the meters proceeded until the conclusion of this phase of testing.

Event B test conditions are summarized in the following table.

| Meter Number | Start Totalizer (gallons) | Actual Meter Calibration (cubic inches) | System Check |
|---|---|---|---|
| 1 | 117030.0 | +0 | No Leak |
| 2 | 286128.8 | −5 | No Leak |
| 3 | 155532.1 | +6 | No Leak |
| 4 | 140424.4 | −1 | No Leak |
| 5 | 228193.9 | +6 | No Leak |
| 6 | 139324.9 | +0 | No Leak |

The statistically calculated alpha values for meters 1–6 of event B are illustrated in FIGS. 10–15, in a manner similar to that described above with respect to event A and FIGS. 3–9. Again, the calculated meter calibration values resulting from the regression analysis method tend to approximately the actually measured meter error calibration values. The alpha value/meter calibration approximation and confidence bounds improve over time as more and more data are collected.

A number of embodiments of the invention have been described. Nevertheless, it will be understood that various modifications may be made without departing from the spirit and scope of the invention. Accordingly, other embodiments are within the scope of the following claims.

What is claimed is:

1. A method of estimating the measuring accuracy of each of a plurality of dispensing meters which dispense fluid from a fluid dispensing system including a storage tank, comprising:
measuring a volume of fluid dispensed through each of the plurality of dispensing meters during a plurality of time intervals during which fluid is simultaneously dispensed through the plurality of dispensing meters;
measuring a volume of fluid dispensed from the storage tank during each of the plurality of time intervals; and
calculating a fraction of the volume of fluid dispensed through each of the dispensing meters by performing a regression analysis with respect to the measured volume of fluid dispensed from the storage tank equated with a fraction of a sum of the measured volumes of fluid dispensed through the plurality of dispensing meters during each of the plurality of time intervals, the fraction of the sum of the measured volumes of fluid dispensed through the plurality of dispensing meters being the sum of the fractions of the measured volumes of fluid dispensed through each of the dispensing meters on average over the plurality of time intervals.

2. The method of claim 1 wherein the regression analysis includes a least squares regression.

3. The method of claim 1 wherein the volume of fluid dispensed from the storage tank is measured by measuring the height of the fluid in the storage tank.

4. The method of claim 1 wherein the regression analysis is performed by treating the sum of the measured volumes of fluid dispensed through the plurality of dispensing meters as independent variables.

5. The method of claim 1 further comprising identifying leakage from the fluid dispensing system.

6. The method of claim 1 further comprising accurately measuring performance of a vapor recovery system of the fluid storage system by comparing an amount of fluid recovered from vapor against an actual amount of fluid dispensed through the dispensing meters.

7. An apparatus for estimating measuring accuracy for a fluid dispensing system including a storage tank, comprising:
a plurality of dispensing meters which dispense fluid from the fluid dispensing system and which measure a volume of fluid dispensed through each of the plurality of dispensing meters during a plurality of time intervals during which fluid is simultaneously dispensed through the plurality of dispensing meters;
a gauge for measuring a volume of fluid dispensed from the storage tank during each of the plurality of time intervals; and
a processor for collecting data indicative of the volumes of fluid measured by the plurality of dispensing meters and the gauge and for calculating a fraction of the volume of fluid dispensed through each of the dispensing meters by performing a regression analysis with respect to the measured volume of fluid dispensed from the storage tank equated with a fraction of a sum of the measured volumes of fluid dispensed through the plurality of dispensing meters during each of the plurality of time intervals, the fraction of the sum of the measured volumes of fluid dispensed through the plurality of dispensing meters being the sum of the fractions of the measured volumes of fluid dispensed through each of the dispensing meters on average over the plurality of time intervals.

8. A method of determining a rate of leakage for fluid leaking from a fluid dispensing system, which includes either one or a plurality of dispensing meters for dispensing fluid and a storage tank, the method comprising:
measuring a volume of fluid dispensed through the dispensing meter during a plurality of time intervals each having an elapsed time;
measuring a volume of fluid dispensed from the storage tank during the elapsed time of each of the plurality of time intervals; and
calculating a rate of leakage for fluid leaking from the fluid dispensing system by performing a regression analysis with respect to the measured volume of fluid dispensed from the storage tank equated with a fraction of a sum of the measured volume of fluid dispensed through the dispensing meter and the elapsed time during each of the plurality of time intervals, the fraction of the sum of the measured volume of fluid dispensed through the dispensing meter and the elapsed time being the sum of a fraction of the measured volume of fluid dispensed through the dispensing meter and the rate of leakage multiplied by the elapsed time on average over the plurality of time intervals.

9. The method of claim 8 further comprising
estimating the measuring accuracy of each of the dispensing meters by calculating the fraction of the measured volume of fluid dispensed through each of the dispensing meters.

10. The method of claim 8 further comprising
measuring a volume of fluid dispensed through each of a plurality of dispensing meters during the plurality of time intervals; and performing the regression analysis with respect to the measured volumes of fluid dispensed through each of the dispensing meters.

11. The method of claim 8 wherein each of the plurality of time intervals occurs when no fluid is being dispensed from the fluid dispensing system.

12. The method of claim 8 wherein the fluid storage system further includes a fluid line connecting the storage tank and the dispensing meter, and the rate of leakage includes a rate of leakage from the storage tank and a rate of leakage from the fluid line.

13. The method of claim 12 further comprising determining the rate of leakage from the fluid line by the regression analysis.

14. The method of claim 11 wherein each of the plurality of time intervals occurs when there is fluid in the fluid line and no product is being dispensed.

15. The method of claim 11 wherein each of the plurality of time intervals occurs when there is no fluid in the fluid line.

* * * * *